(12) United States Patent
Patel et al.

(10) Patent No.: US 11,498,627 B2
(45) Date of Patent: Nov. 15, 2022

(54) CARGO SYSTEMS FOR USE WITH VEHICLES, SUCH AS AUTONOMOUS DELIVERY VEHICLES

(71) Applicant: UDELV INC., Burlingame, CA (US)

(72) Inventors: Akshat Patel, San Francisco, CA (US); Daniel Laury, Burlingame, CA (US)

(73) Assignee: UDELV, Inc., Burlingame, CA (US)

( * ) Notice: Subject to any disclaimer, the term of this patent is extended or adjusted under 35 U.S.C. 154(b) by 140 days.

(21) Appl. No.: 16/778,136

(22) Filed: Jan. 31, 2020

(65) Prior Publication Data

US 2020/0307721 A1 Oct. 1, 2020

Related U.S. Application Data

(63) Continuation of application No. 16/226,511, filed on Dec. 19, 2018, now Pat. No. 10,592,851.

(51) Int. Cl.
| | |
|---|---|
| *B65D 90/00* | (2006.01) |
| *B62D 33/04* | (2006.01) |
| *G06Q 10/08* | (2012.01) |
| *G05D 1/00* | (2006.01) |

(52) U.S. Cl.
CPC ....... *B62D 33/042* (2013.01); *B65D 90/0066* (2013.01); *G05D 1/0088* (2013.01); *G06Q 10/0832* (2013.01); *G06Q 10/0836* (2013.01)

(58) Field of Classification Search
CPC ............ B65D 90/0086; B65D 90/0073; B65D 90/0066; G05D 1/0088; G06Q 10/0832; G06Q 10/0836; B62D 33/042; B60J 5/06; B60J 5/12; B60J 5/14
See application file for complete search history.

(56) References Cited

U.S. PATENT DOCUMENTS

| | | | | |
|---|---|---|---|---|
| 5,127,697 A | * | 7/1992 | St. Marie | B62D 33/08 296/37.6 |
| 6,099,070 A | * | 8/2000 | Yocum | B62D 33/042 296/37.6 |
| 7,641,253 B2 | * | 1/2010 | Steiger | B60R 11/06 296/24.4 |
| 9,127,872 B1 | * | 9/2015 | Chainey | G06Q 10/083 |
| 10,479,418 B1 | * | 11/2019 | Patel | B65D 90/0086 |
| 10,592,851 B1 | * | 3/2020 | Patel | B65D 90/0066 |
| 2019/0051083 A1 | * | 2/2019 | Goldberg | G06Q 10/08355 |

* cited by examiner

*Primary Examiner* — Stephen T Gordon
(74) *Attorney, Agent, or Firm* — Foundation Law Group LLP; J D Harriman

(57) ABSTRACT

Systems and methods for delivering a requested payload using an autonomous delivery vehicle are described herein. In some embodiments, a cargo system for use with an autonomous delivery vehicle can include a frame defining a cargo space having an opening. A plurality of partitions can be positioned within the cargo space and configured to divide the cargo space into compartments. In some embodiments, the partitions are movable so that the cargo space can be divided into efficiently-sized compartments based on, for example, size characteristics of the payload. The cargo system can further include an access system configured to selectively define an aperture over the opening of the cargo space. The access system can vary the size and position of the aperture to provide access to only a selected one of the compartments regardless of the size and/or position of the selected compartment.

23 Claims, 16 Drawing Sheets

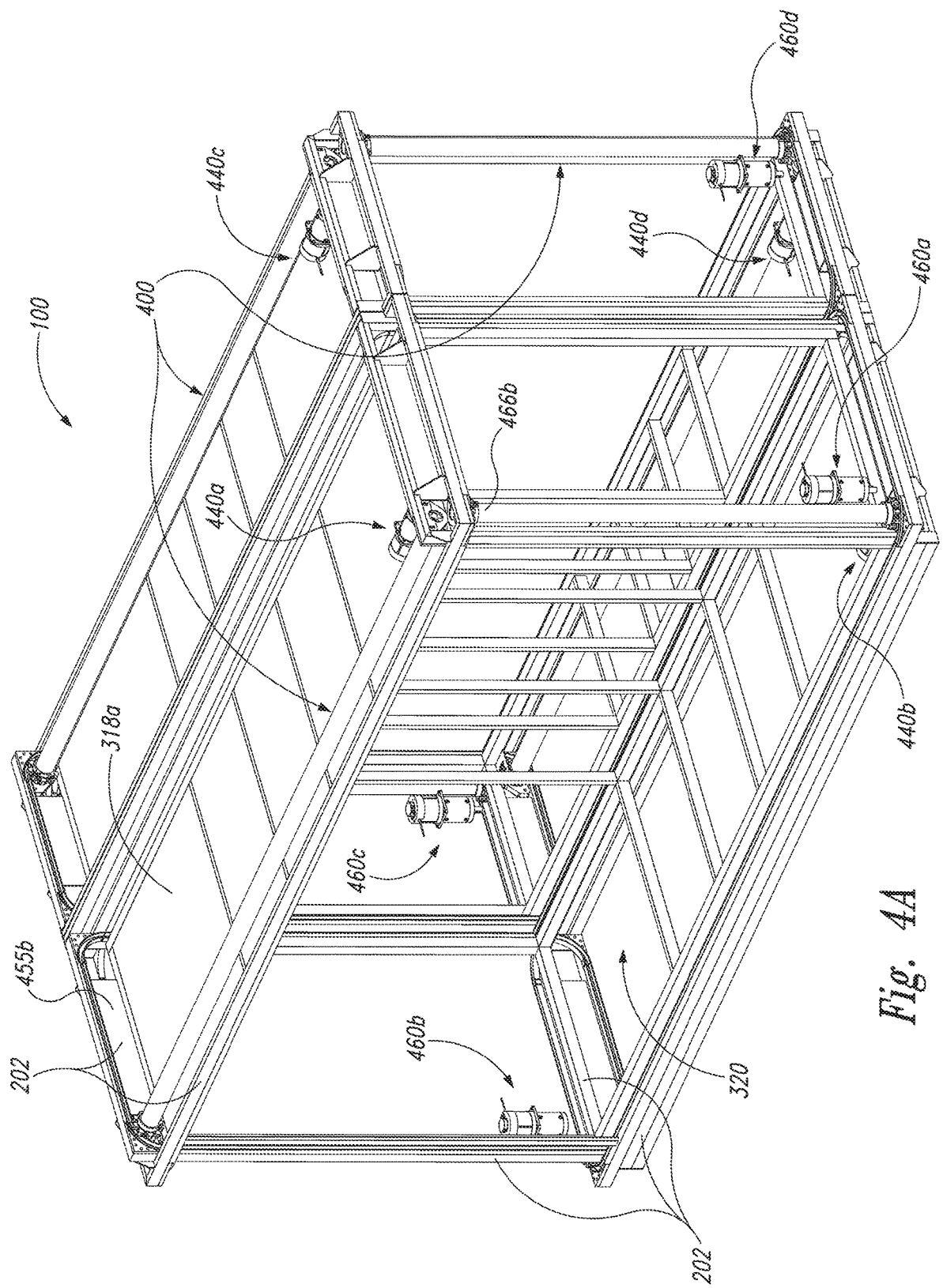

CARGO SYSTEMS FOR USE WITH VEHICLES, SUCH AS AUTONOMOUS DELIVERY VEHICLES

CROSS-REFERENCE TO RELATED APPLICATION

This application is a continuation of U.S. patent application Ser. No. 16/226,511, filed Dec. 19, 2018, and titled "CARGO SYSTEMS FOR USE WITH VEHICLES, SUCH AS AUTONOMOUS DELIVERY VEHICLES," which is hereby incorporated by reference in its entirety.

TECHNICAL FIELD

The present technology relates to cargo systems having configurable cargo spaces and, in particular, to cargo systems that provide secure access to configurable cargo spaces during automated deliveries via autonomous vehicles.

BACKGROUND

With the rapid growth of e-commerce, a pressing need to fulfil on-demand and high-volume delivery has emerged. Local businesses require a competitive solution to address neighborhood deliveries that are cost-effective, frequent, timely, and secure. With rising demand, the logistics industry is faced with increasing transportation bandwidth needs in an industry and operational structure that is already fragmented. While autonomous vehicles may be able to help alleviate many of these challenges, deploying autonomous vehicles as delivery agents has presented a new set of challenges related to system integration, resource deployment/management, etc.

For example, it is often required to limit a particular recipient's access to only the item or items on the vehicle that are intended for delivery to the recipient, while preventing the recipient from accessing other items carried by the autonomous vehicle that are intended for other recipients. Some cargo systems address this problem by carrying the items for individual recipients in separate compartments having individual doors that can only be opened by the intended recipient. Because the sizes of the compartments are fixed, however, such systems are often inefficient because of unused space in the individual compartments.

BRIEF DESCRIPTION OF THE DRAWINGS

Many aspects of the present technology can be better understood with reference to the following drawings. The components in the drawings are not necessarily to scale. Instead, emphasis is placed on clearly illustrating the principles of the present technology.

FIGS. 4A and 4B are isometric views of the cargo pod illustrating a door drive system configured in accordance with embodiments of the present technology.

DETAILED DESCRIPTION

Figure 1A:
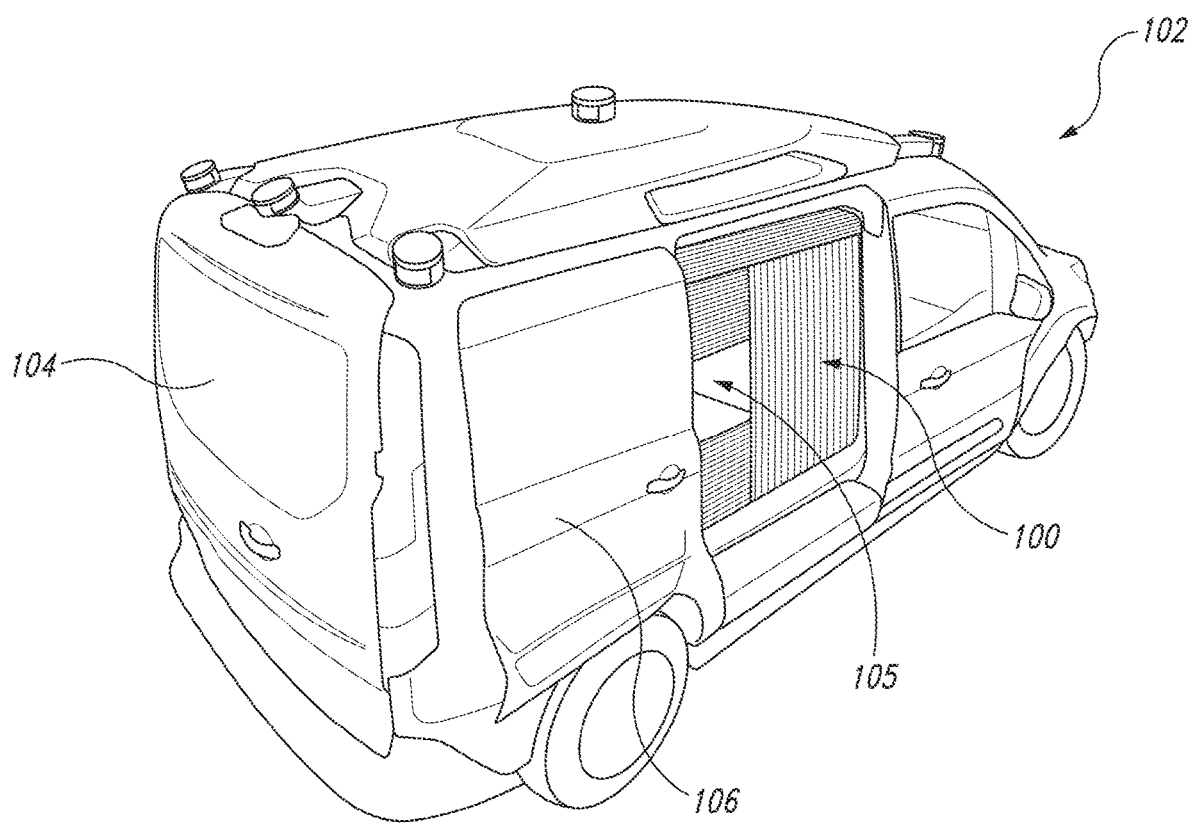
FIGS. 1A and 1B are perspective views of an autonomous delivery vehicle carrying a cargo pod configured in accordance with embodiments of the present technology.

The following disclosure describes various embodiments of systems and methods for providing efficient use of storage space in autonomous delivery vehicles. In some embodiments, over-the-road autonomous delivery vehicles can include a cargo system or "pod" having a plurality of cargo compartments/spaces that can be individually sized to accommodate a particular item or group of items for delivery. For example, in some embodiments the cargo system can include a framework defining a cargo space having an opening. In some embodiments, the cargo space is configured to be partitioned into a plurality of compartments of variable size, such as by moving and/or removing/adding one or more vertical partitions and/or shelves. This enables the cargo space to be dynamically arranged to efficiently receive a plurality of items for delivery having different physical characteristics (e.g., size, shape, weight, type, number, etc.). For example, the size of the compartments can be adjusted to generally correspond to the size of items for delivery based on merchant preferences. In this manner, the volumetric efficiency of the cargo space is increased as compared to conventional fixed-size cargo spaces or lockers, as the dimensions of the compartments can be varied to accommodate specific cargo and space is not wasted.

Embodiments of the cargo system can further include an access system configured to provide access to a selected one of the compartments. In some embodiments, the access system includes a pair of first doors and a pair of second doors that are operably coupled to the framework and are individually movable over/across the opening of the cargo space. In some embodiments, the first doors are individually movable back and forth along a first axis (e.g., a horizontal axis), and the second doors are individually movable back and forth along a second axis (e.g., a vertical axis), different than the first axis. The first and second doors can together define a variable aperture (e.g., a rectangular aperture) over the opening of the cargo space through which, for example, a delivery recipient can access the cargo space to retrieve an item. Moreover, the first and/or second doors can be moved along the respective axes to vary the position and/or size of the aperture over the opening of the cargo space to provide access to different portions thereof. By moving the doors to vary the size and/or position of the aperture, the cargo system can limit access to any one of the individual compartments of the cargo space regardless of the dimensions of the compartment or the items therein, and without inadvertently providing access to other compartments. Thus, a delivery recipient is only able to retrieve the items intended for delivery to them from the cargo system—and not the items intended for delivery to other recipients that could be located at different delivery locations. Accordingly, the cargo systems of the present technology can enable secure access to individual compartments within a cargo space while also enabling the cargo space to be configured to efficiently match the size or other characteristics of items to be delivered.

In another aspect of the present technology, the cargo pods can be easily removable from a delivery vehicle to facilitate pre-loading at, for example, the location of a warehouse, merchant, etc. For example, a delivery system can include multiple such cargo pods that can be interchangeably swapped out from delivery vehicles to permit simultaneous loading and delivering operations. For example, one cargo pod can be pre-loaded while a delivery vehicle is on the road making deliveries and, when the vehicle comes back with its cargo pod empty, the empty cargo pod can be quickly swapped with the pre-loaded cargo pod. Thus, the cargo pods of the present technology can reduce the downtime that delivery vehicles are required to be stationary during loading and therefore not making deliveries. It is expected that the ability to quickly and easily swap empty cargo pods for full cargo pods can significantly increase the efficiency of merchants/shippers in view of the rapid growth of e-commerce and the increasing demand for same day, if not same hour, delivery.

In another aspect of the present technology, it is expected that the use of cargo pods can substantially decrease the manufacturing and/or operating costs of the underlying autonomous delivery vehicles used to carry the cargo pods. For example, the delivery vehicles may consist of a simple rolling chassis, powertrain (e.g., an electric or hybrid powertrain), and autonomy sensors and computing equipment and circuitry. More specifically, such delivery vehicles will not require a cabin, seats, seat belts, airbags, and/or other features that are common to conventional delivery vehicles that carry passengers and are relatively expensive to build and/or operate. In some embodiments, a delivery system could include multiple delivery vehicles each consisting of a rolling chassis and powertrain, and the chassis could be provided in different sizes (e.g., three different lengths) for short-haul, medium-haul, and long-haul deliveries. In some embodiments, the cargo pods can be intermodal—that is, for example, configured to be moved without interruption from a sea-going vessel, to a railcar, and to one of the delivery vehicles.

Certain details are set forth in the following description and in FIGS. 1A-8 to provide a thorough understanding of various embodiments of the present technology. In other instances, well-known structures, materials, operations, and/or systems often associated with autonomous vehicles, electromechanical systems, etc., are not shown or described in detail in the following disclosure to avoid unnecessarily obscuring the description of the various embodiments of the technology. Those of ordinary skill in the art will recognize, however, that the present technology can be practiced without one or more of the details set forth herein, or with other structures, methods, components, and so forth.

The terminology used below is to be interpreted in its broadest reasonable manner, even though it is being used in conjunction with a detailed description of certain examples of embodiments of the technology. Indeed, certain terms may even be emphasized below; however, any terminology intended to be interpreted in any restricted manner will be overtly and specifically defined as such in this Detailed Description section.

The accompanying Figures depict embodiments of the present technology and are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the invention. Many of the details, dimensions, angles and other features shown in the Figures are merely illustrative of particular embodiments of the disclosure. Accordingly, other embodiments can have other details, dimensions, angles and features without departing from the spirit or scope of the present invention. In addition, those of ordinary skill in the art will appreciate that further embodiments of the invention can be practiced without several of the details described below.

In the Figures, identical reference numbers identify identical, or at least generally similar, elements. To facilitate the discussion of any particular element, the most significant digit or digits of any reference number refers to the Figure in which that element is first introduced. For example, element 110 is first introduced and discussed with reference to FIG. 1.

The headings provided herein are for convenience only and do not necessarily affect the scope of the embodiments.

I. Overview

Figure 1B:
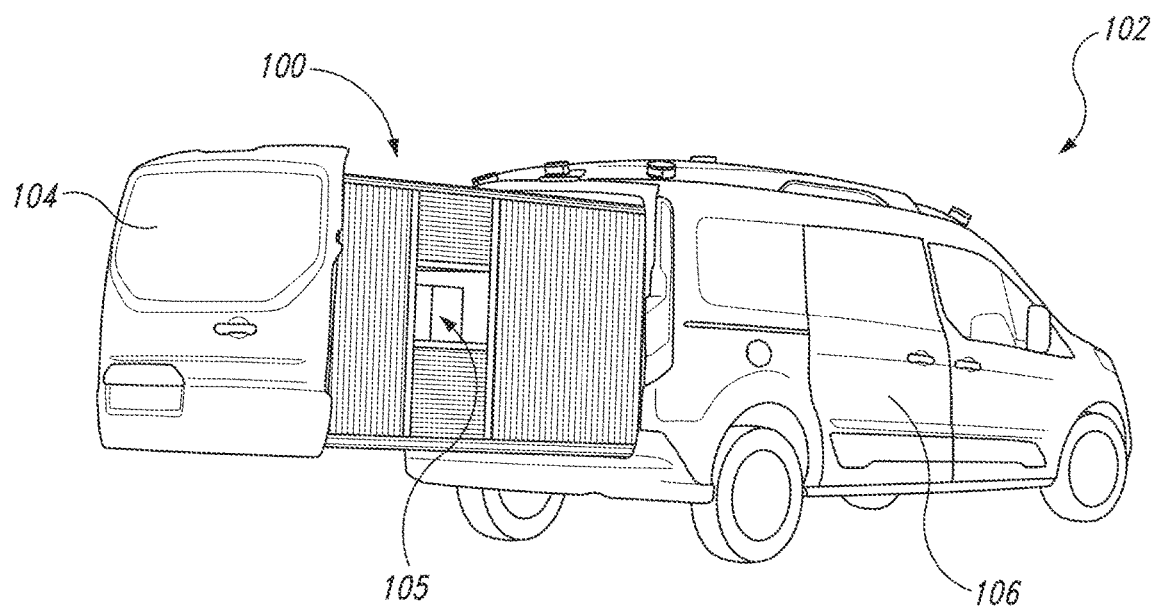

FIGS. 1A and 1B are perspective views of an autonomous delivery vehicle 102 ("vehicle 102") configured in accordance with embodiments of the present technology. The vehicle 102 can be an over-the-road vehicle capable of operating (e.g., including maneuvering and/or traversing through physical space and/or controlling vehicle functions, components, or subsystems thereof) according to and through its surrounding environment. Such vehicles include, for example, automobiles and trucks with capabilities according to Society of Automotive Engineers (SAE) defined Level 3 capability or above (e.g., at least being able to detect the environment around them). In some embodiments, a delivery management system can: allocate/move the vehicle 102 to specific geographic regions, generate delivery routes including one or more pickup locations (e.g., locations corresponding to one or more merchants) and one or more delivery locations (e.g., locations corresponding to one or more intended delivery recipients), control the vehicle 102 to traverse the delivery routes, coordinate loading processes at the pickup locations, and/or coordinate unloading/access processes at the delivery locations. In some embodiments, the delivery management system can include features similar to the features of the delivery management systems disclosed in (i) U.S. patent application Ser. No. 15/875,639, titled "DELIVERY MANAGEMENT SYSTEM," and filed Jan. 19, 2018, and/or (ii) U.S. patent application Ser. No. 15/673,601, titled "MULTI-STAGE OPERATION OF AUTONOMOUS VEHICLES," and filed on Aug. 10, 2017, both of which are incorporated herein by reference in their entireties.

Referring to FIGS. 1A and 1B together, the vehicle 102 includes a cargo system or pod 100 configured to carry one or more delivery items (e.g., ordered products, goods, food, etc.) to be delivered and to provide secure access to the items to corresponding delivery recipients at one or more delivery locations. As described in greater detail below with reference to FIGS. 2-4G, the cargo pod 100 can include a plurality of compartments or enclosures for carrying the items, and an access system configured to define an aperture 105 that is positionable over a corresponding one or more of the compartments to provide access to the item(s) therein. In some embodiments, the access system can include two sets of doors that are independently movable/actuatable to position the aperture 105 (e.g., a rectangular or square aperture) over any particular compartment or group of compartments.

The cargo pod 100 can be accessed via one or more doors of the vehicle 102. For example, in the illustrated embodiment the vehicle 102 includes a rear door 104 and at least one side door 106. Referring to FIG. 1A, the cargo pod 100 can have a first position in which the cargo pod 100 is positioned fully within the vehicle 102. In the first position, at least a portion of the compartments of the cargo pod 100 can be accessed via the side door 106 and/or another side door on the opposite side of the vehicle 102 (obscured in FIGS. 1A and 1B). Referring next to FIG. 1B, in some embodiments the cargo pod 100 can also have a second position in which at least a portion of the cargo pod 100 has been moved (e.g., slid longitudinally) out of the vehicle 102 through the rear door 104. In the second position, at least a portion of the compartments can be directly accessed without entering through a side door of the vehicle 102. In some embodiments, the cargo pod 100 can be fully removed from the vehicle 102 to, for example, facilitate loading of the cargo pod 100 and/or to allow a different cargo pod (e.g., a pre-loaded cargo pod) to be installed into the vehicle 102.

II. Selected Embodiments of Cargo Pods

Figure 2:
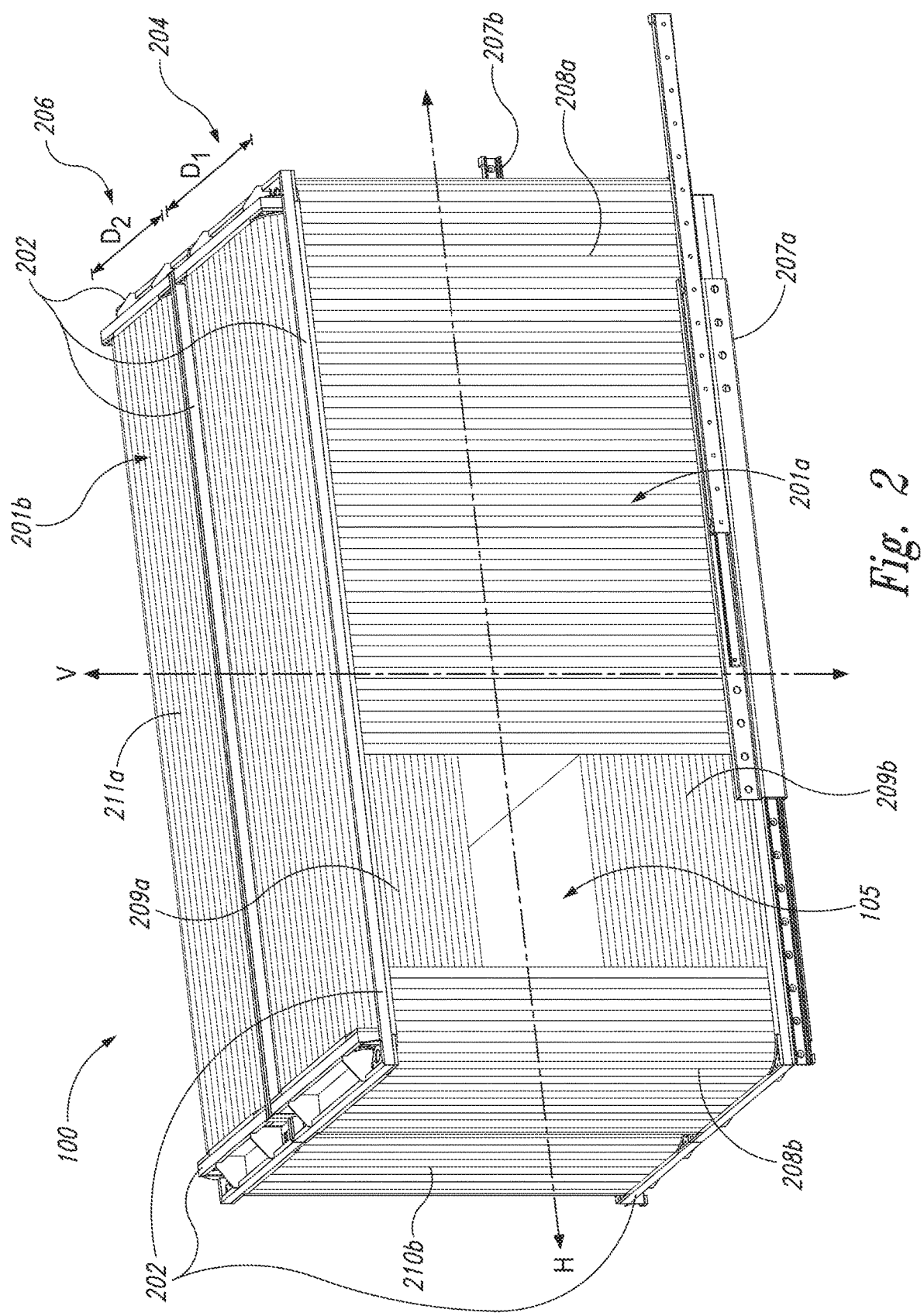
FIG. 2 is an isometric view of the cargo pod of FIGS. 1A and 1B configured in accordance with an embodiment of the present technology.

FIG. 2 is an isometric view of the cargo pod 100 removed from the vehicle 102 and configured in accordance with an embodiment of the present technology. In the illustrated embodiment, the cargo pod 100 includes a framework 202 having a first side portion 204 and a second side portion 206 that each define an interior cargo space for receiving and transporting payloads (e.g., such as food items, consumer goods, etc.) therein. In some embodiments, the framework 202 can be formed from aluminum, carbon fiber, or other rigid and light-weight materials.

A first access system 201a is operably coupled to the first side portion 204 of the framework 202, and a second access system 201b is operably coupled to the second side portion 206 of the framework 202. In the illustrated embodiment, the first access system 201a includes a first pair of horizontal doors 208 (identified individually as a first horizontal door 208a and a second horizontal door 208b) and a first pair of vertical doors 209 (identified individually as a first vertical door 209a and a second vertical door 209b). As described in detail below, the doors 208, 209 are individually movable to dynamically vary the position and/or shape of the aperture 105 to allow access to any one or more compartments within the cargo space of the first side portion 204. Similarly, the second access system 201b includes a second pair of horizontal doors 210 (only a second horizontal door 210b is visible in FIG. 2) and a second pair of vertical doors 211 (only a first vertical door 211a is visible in FIG. 2) that are individually movable to dynamically vary the position and/or shape of another aperture (obscured in FIG. 2) to allow access to any one or more compartments within the cargo space of the second side portion 206 of the framework 202. In other embodiments, the access systems 201 can include more or fewer than the illustrated four doors, and/or the doors can have other suitable orientations/configurations.

Figure 9:
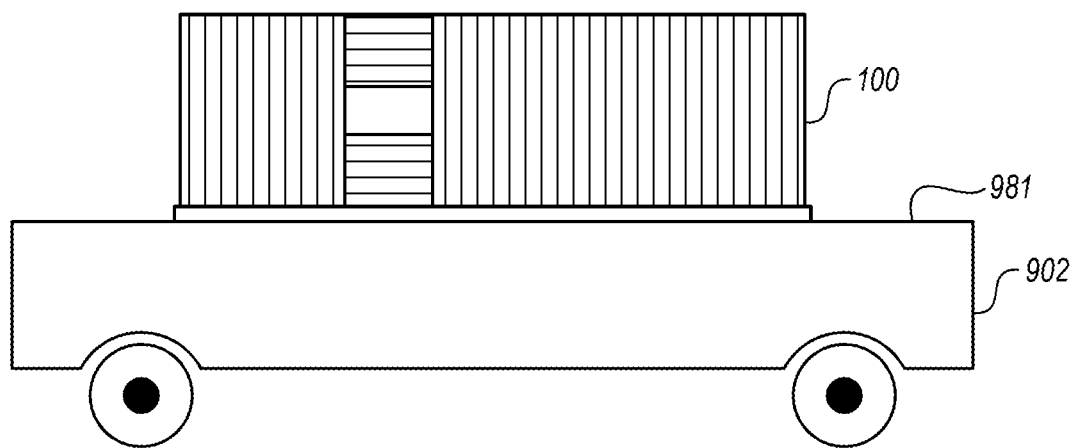
FIG. 9 is a side view of an autonomous delivery vehicle configured in accordance with another embodiment of the present technology.

As further shown in FIG. 2, a first slide-out rail 207a and a second slide-out rail 207b can be operably coupled to the first side portion 204 and the second side portion 206 of the framework, respectively. The slide-out rails 207 can be operably coupled to a linear actuator, motor, or other drive system (not pictured) to enable the cargo pod 100 to be partially or entirely slid in the longitudinal direction out of the vehicle 102 (e.g., through the rear door 104 as shown in FIG. 1B). In some embodiments, the cargo pod 100 can be detached from the slide-out rails 207 and/or the slide-out rails 207 can be detached from the vehicle 102 to enable the cargo pod 100 to be fully removed from the vehicle 102 to, for example, facilitate efficient loading of the cargo spaces of the cargo pod 100 at a merchant location, a distribution center, restaurant, etc. In some embodiments, the cargo pod 100 can be configured to be loaded into/onto and removed from more than one type of vehicle (e.g., a car, truck, etc.). In some embodiments, the slide-out rails 207 can be omitted and the cargo pod 100 can be loaded into/onto a vehicle in other manners (e.g., placed on a flatbed as shown in FIG. 9). In some embodiments, the cargo pod 100 and/or the vehicle 102 can include a locking mechanism (not pictured) for locking the cargo pod 100 relative to the vehicle 102—for example, when the vehicle 102 is positioned on a high-grade street. In some embodiments, the locking mechanism can include a solenoid plunger coupled to the cargo pod 100 or the vehicle 102 and configured to extend into a corresponding recess to lock the cargo pod 100 to the vehicle 102, and to prevent its movement along the slide-out rails 207.

Figure 3A:
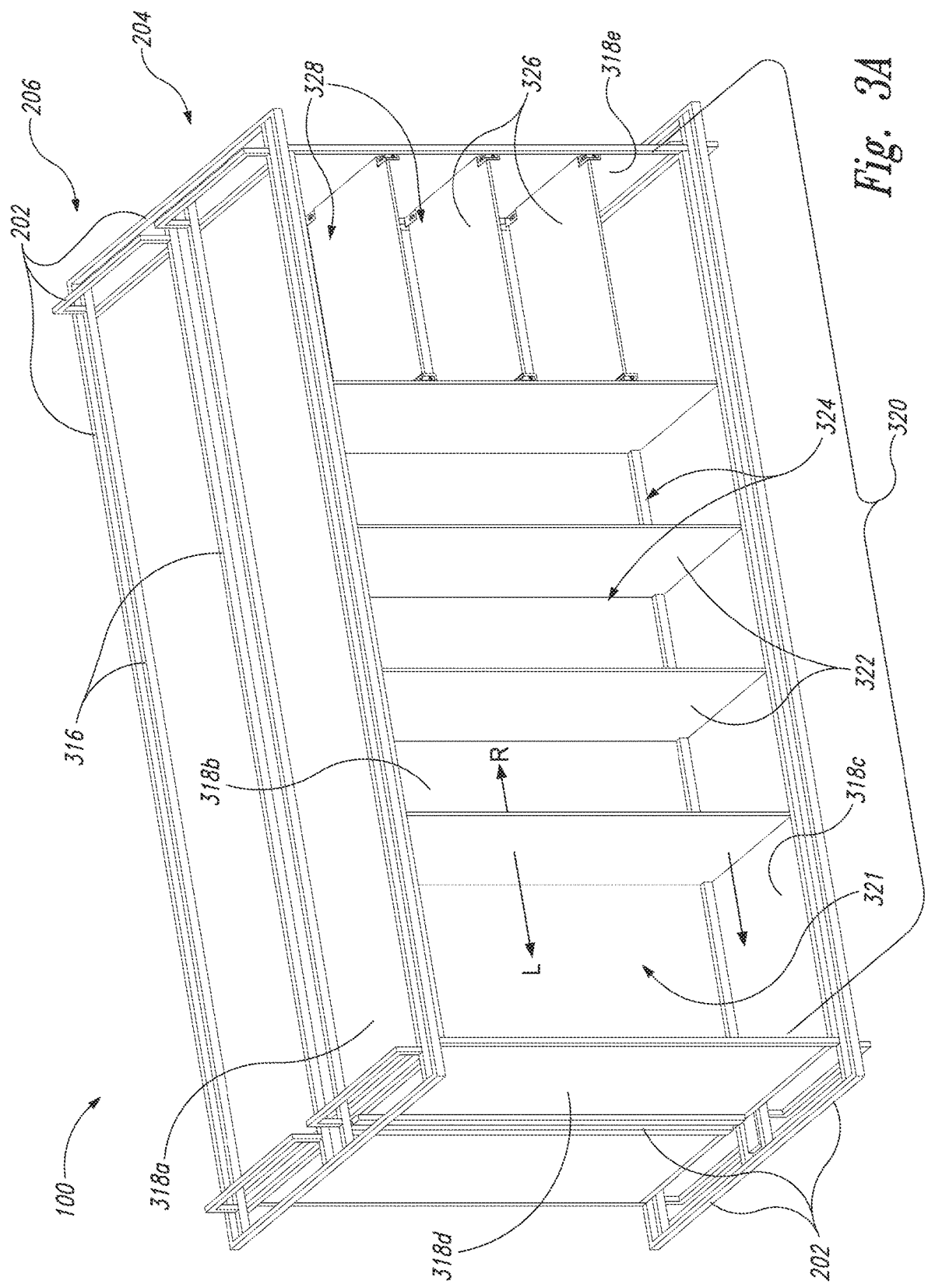
FIG. 3A is an isometric view of the cargo pod illustrating a modifiable shelving arrangement configured in accordance with an embodiment of the present technology.

FIG. 3A is an isometric view of the cargo pod 100 illustrating a flexible (e.g., easily modifiable) shelving arrangement configured in accordance with an embodiment of the present technology. The doors 208-211 (FIG. 2) and the associated drive mechanisms (shown in FIGS. 4A-4G) are removed from FIG. 3A for the sake of clarity. In some embodiments, the framework 202 can be formed from a plurality of elongate members 316 (e.g., tubes, extruded members, etc.) that are welded or otherwise fastened together to form the supporting structure of the side portions 204, 206. In some embodiments, the side portions 204, 206 are manufactured/assembled as separate assemblies that are bolted or otherwise fastened together after installation into the vehicle 102. In general, the features and configurations of the side portions 204, 206 can be generally similar or identical. Accordingly, while the details of the first side portion 204 are described in detail below, one of ordinary skill in the art will understand that the second side portion 206 can have the same or similar features. Moreover, in other embodiments the cargo pod 100 can include only the first side portion 204 or the second side portion 206.

In the illustrated embodiment, a plurality of panels 318 (including an upper panel 318a, a rear panel 318b, a lower panel 318c, a first side panel 318d, and a second side panel 318e) are coupled to the first side portion 204 of the framework 202 to enclose or define a cargo space 320 having an opening 321 (e.g., a generally planar opening). The panels 318 can be welded to the framework 202 or attached to the framework 202 via, for example, a plurality of fasteners (e.g., screws, bolts, etc.). A plurality of vertical partitions 322 can be coupled to the framework 202 and/or the panels 318 to separate the cargo space 320 into a plurality of cargo units 324. The vertical partitions 322 can be permanently or releasably secured to the framework 202 and/or the panels 318. For example, the vertical partitions 322 can be secured via brackets (e.g., L-brackets) and fasteners to one or more of the elongate members 316 and/or the panels 318. In some embodiments, the vertical partitions 322 are slidably or otherwise movably attached to the framework 202 and/or to the panels 318 (e.g., via tracks, wheels, etc.) such that the relative positioning of the vertical partitions 322 can be varied to vary the size and/or position of the corresponding cargo units 324. For example, in some embodiments some or all of the vertical partitions 322 can be moved laterally in directions L and/or R between the side panels 318d, e.

Figure 3B:
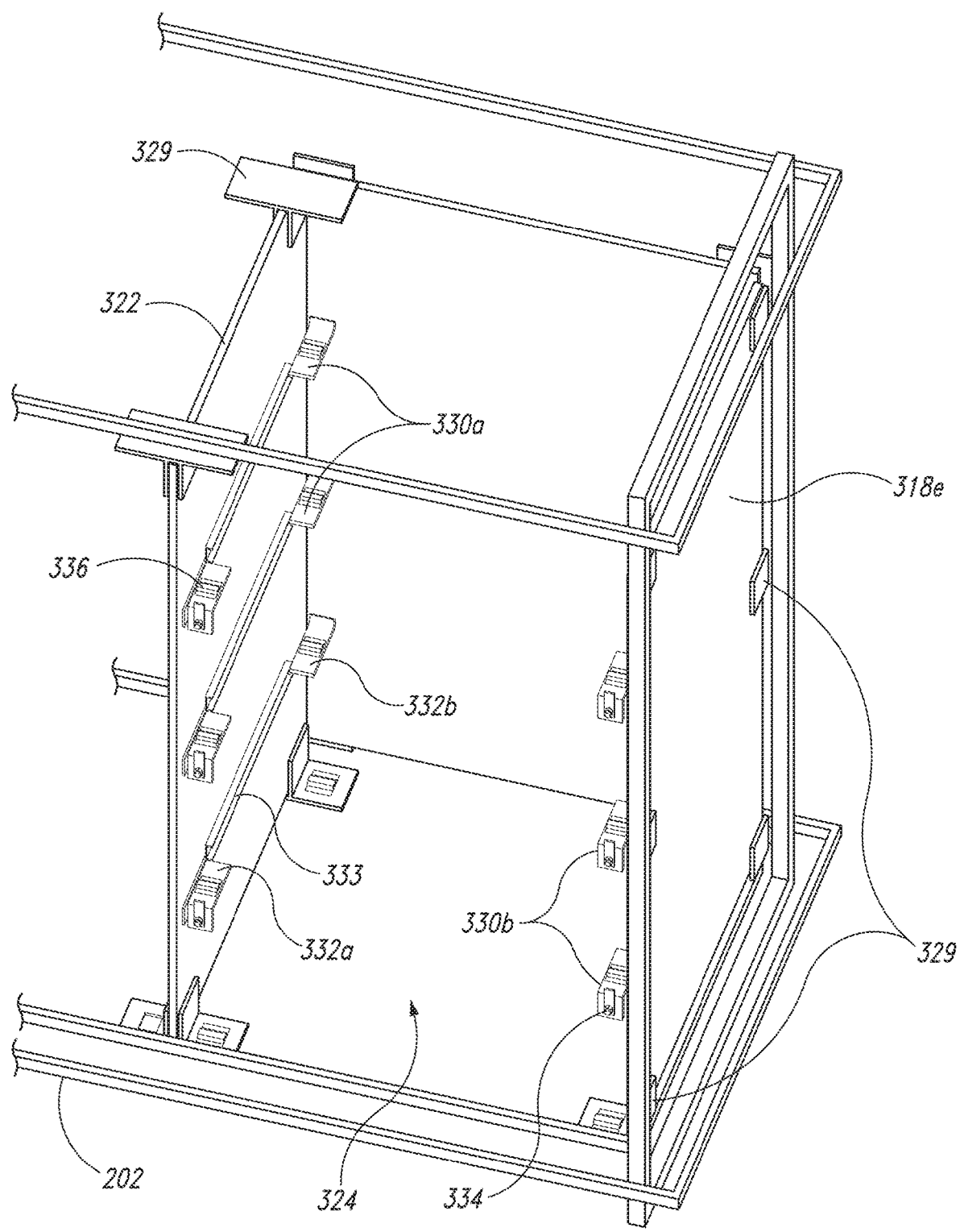
FIG. 3B is an enlarged isometric view of a representative cargo unit of the cargo pod configured in accordance with an embodiment of the present technology.

As further shown in FIG. 3A, the cargo pod 100 can include a plurality of horizontal partitions or shelves 326 configured to extend generally horizontally between (i) pairs of the vertical partitions 322 and/or (ii) one of the vertical partitions 322 and one of the side panels 318d, e (e.g., between a leftmost one of the vertical partitions 322 and the first side panel 318d and/or between a rightmost one of the vertical partitions 322 and the second side panel 318e). The shelves 326 can divide the individual cargo units 324 into smaller compartments 328 that can be configured to receive one or more items to be delivered to a delivery recipient. Although four vertical partitions 322 and three shelves 326 per cargo unit 324 are illustrated in FIG. 3B, in other embodiments the cargo pod 100 can have any number of vertical partitions 322 and/or shelves 326 depending on, for example, the characteristics (e.g., size, shape, weight, number, etc.) of the items to be carried within the cargo space 320. In some embodiments, the panels 318, the vertical partitions 322, and/or the shelves 326 can be formed from composite materials, such as a sandwich of carbon fiber or fiberglass sheets and a honeycomb core.

FIG. 3B is an enlarged isometric view of one of the cargo units 324 (e.g., the rightmost one of the cargo units 324 shown in FIG. 3A) with the shelves 326 and the upper panel 318a removed for the sake of clarity. In the illustrated embodiment, the rightmost one of the vertical partitions 322 and the second side panel 318e enclose the cargo unit 324. The vertical partition 322 and/or the second side panel 318e can be secured via brackets 329 to the adjacent ones of the panels 318 (e.g., the upper panel 318a, the rear panel 318b, and/or the lower panel 318c) and/or the framework 202. In some embodiments, some or all of the brackets 329 include a sensor (e.g., a force sensitive resistor (FSR), piezoelectric sensor, mechanical switch, etc.; not shown) configured to detect the presence or absence of the vertical partition 322 and/or the second side panel 318e. In the illustrated embodiment, first support members 330a are attached to the vertical partition 322 and second support members 330b are attached to the second side panel 318e. The first support members 330a are positioned at generally the same elevation as and face corresponding ones of the second support members 330b. In some embodiments, each pair of facing support members 330 is configured to slidably receive and secure one of the shelves 326.

Figure 3C:
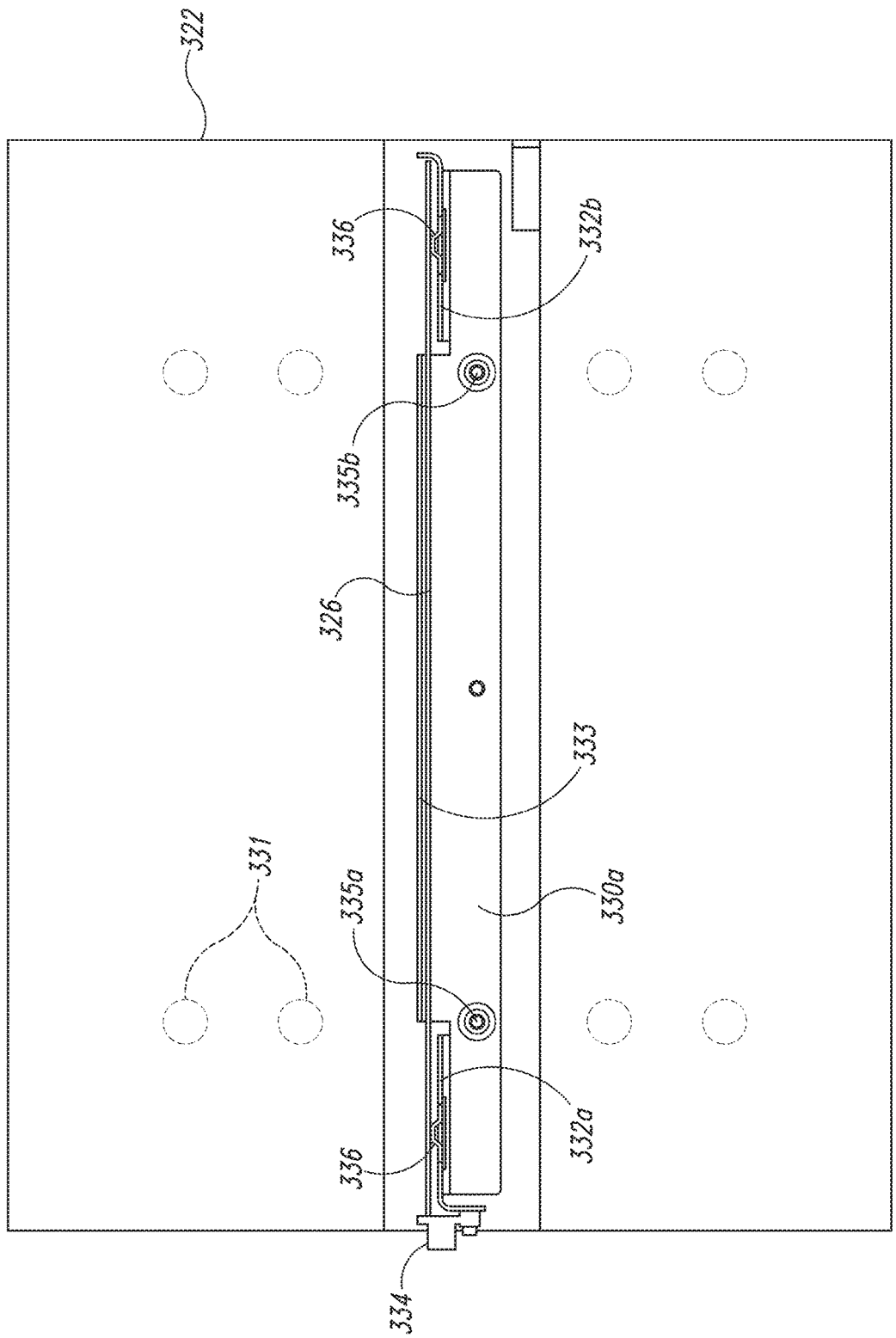
FIG. 3C is an enlarged interior side view of a portion of the cargo unit of FIG. 3B configured in accordance with an embodiment of the present technology.

More particularly, FIG. 3C is an enlarged interior side view of a portion of the cargo unit 324 shown in FIG. 3B and illustrating one of the shelves 326 secured by a corresponding one of the first support members 330a. In the illustrated embodiment, the first support member 330a is coupled to the vertical partition 322 via a first pin 335a and a second pin 335b that extend through holes in the first support member 330a and into corresponding holes in the vertical partition 322. In some embodiments, the vertical partition 322 can include additional holes 331 (shown in phantom) at one or more different elevations, and the pins 335 can be removable, spring-loaded, etc., such that the first support member 330a can be positioned vertically at different elevations to, for example, vary the vertical positioning of the shelves 326 (e.g., in a direction between the upper and lower panels 318a, c) and thus the volume of the corresponding compartments 328. Some or all of the support members 330 can be coupled to the vertical partitions 322 and/or side panels 318d, e in the manner illustrated in FIG. 3C, or in other suitable manners (e.g., along tracks) that enable the vertical position of the support members 330 to be varied. In other embodiments, the support members 330 can be permanently attached to the vertical partitions 322 and/or the side panels 318d, e at desired locations.

Referring to FIGS. 3B and 3C together, each of the support members 330 can have generally similar features including a first support portion 332a, a second support portion 332b, and a retaining portion 333 extending laterally between the support portions 332. When the shelves 326 are installed, the shelves 326 are supported by the support portions 332 and are inhibited from moving vertically (e.g., in a direction toward the upper panel 318a) by the retaining portions 333, which overhang an upper edge surface of the shelves 326. In some embodiments, a lowermost one of the shelves 326 (e.g., a floor) can be permanently coupled to the framework 202 and/or the lower panel 318c.

Some or all of the support members 330 can further include a retaining mechanism 334 for releasably securing the shelves 326 and inhibiting horizontal movement of the shelves 326 from the cargo space 320 (e.g., out of the opening 321 of the cargo space 320). In the illustrated embodiment, the retaining mechanisms 334 are quick-release latches that can each be rotated between (i) a first, locked position (illustrated in FIGS. 3B and 3C) in which the retaining mechanisms 334 extend vertically to secure or lock the shelves 326 within the support members 330 to (ii) a second, unlocked position in which the retaining mechanisms 334 permit the shelves 326 to be removed (e.g., slid out) of the support members 330. In other embodiments, the support members 330 can include other retaining mechanisms having other suitable configurations for releasably securing the shelves 326 within the support members 330.

In some embodiments, load sensors 336 are positioned at one or more of the support portions 332 of the support members 330 such that at least a portion of the corresponding shelves 326 is supported on the load sensors 336. For example, in the illustrated embodiment the load sensors 336 are positioned at each of the support portions 332 such that the four corners of each shelf 326 and the weight thereof (and any items placed thereon) is fully supported by and transmitted to the load sensors 336. In some embodiments, one or more of the load sensors 336 can also be positioned on the lowermost brackets 329 for supporting a lowermost one of the shelves 326. The load sensors 336 can include compression load cells, piezoelectric load cells, strain gauges, bending beam load cells, etc. As described in detail below with reference to FIG. 6, the load sensors 336 can be electrically coupled to one or more controllers or other processing devices that are configured to receive information/data from the load sensors and to detect/determine the weight of the shelves 326 and/or any items placed thereon. For example, in some embodiments the load sensors 336 can provide information about which support members 330 have shelves 326 placed thereon (e.g., by detecting a known weight of the shelves 326) and/or information about any items placed on the shelves 326 (e.g., an incremental weight above a known weight of the shelves 326). Thus, the load sensors 336 can provide information about a configuration of the cargo space 320 (e.g., an arrangement of the shelves 326 and thus the sizes of the compartments 328) as well as items carried within the cargo space 320.

In one aspect of the present technology, the cargo space 320 can be selectively partitioned into different arrangements depending on the characteristics (e.g., size, shape, weight, type, number, etc.) of the items to be delivered. For example, because the shelves 326 are removable from the cargo pod 100 and/or can be positioned at different elevations within the cargo space 320, one or more of the shelves 326 can be removed and/or moved to provide a larger volume in one of the cargo units 324 for carrying a larger item. Conversely, one or more of the shelves 326 can be inserted into a cargo unit 324 to form smaller ones of the compartments 328 for carrying smaller items. Likewise, in some embodiments the vertical partitions 322 can be moved (e.g., slid laterally in a direction between the side panels 318d, e) and/or removed to vary the size of the cargo units 324. In this manner, the volumetric efficiency of the cargo space 320 is increased as compared to conventional fixed-shelf cargo spaces, as the dimensions of the compartments 328 and/or the cargo units 324 can be varied to accommodate specific cargo and space is not wasted. In some embodiments, the cargo pod 100 can include slots or cubbies (not pictured) for receiving and temporarily storing any of the vertical partitions 322 or shelves 326 that are removed. In some embodiments, the cargo pod 100 can include additional, removable partitions (e.g., vertical partitions that are attachable between pairs of the shelves 326) for further dividing the cargo space 320 into compartments of a desired size.

Referring to FIGS. 2-3A together, in operation, the doors 208, 209 can be individually actuated to dynamically vary the position and/or shape of the aperture 105 to permit selective access to the cargo space 320. More specifically, the horizontal doors 208 are each movable back and along a first, horizontal axis H (FIG. 2), and the vertical doors 209 are each movable back and forth along a second, vertical axis V (FIG. 2). By varying the size (e.g., the area) and/or location (e.g., the vertical and/or horizontal position) of the aperture 105, the aperture 105 can be positioned to provide access to any one or more of the individual compartments 328 and/or the cargo units 324, while preventing (e.g., blocking) access to the other compartments 328 and/or cargo units 324. For example, as described in greater detail below, a controller can control the doors 208, 209 to position the aperture 105 over/above/around a selected one of the compartments 328 containing an item for delivery to a recipient ready to retrieve the item (e.g., when the delivery recipient is positioned proximate to the cargo pod 100). In this manner, the doors 208, 209 can provide secure access to only a desired portion of the cargo space 320 (e.g., to one or more of the compartments 328)—and can provide the access regardless of the configuration of the cargo space 320 (e.g., the arrangement of the vertical partitions 322, the shelves 326, and/or other components for partitioning the cargo space 320 into smaller spaces).

Moreover, in some embodiments the doors 208, 209 can be moved between (i) an open position in which the doors 208, 209 do not cover any portion of the opening 321 of the cargo space 320 (e.g., the aperture 105 is positioned over the entire opening of the cargo space 320) and (ii) a closed position in which the doors 208, 209 cover the entire opening of the cargo space 320 (e.g., there is no aperture 105). For example, in some embodiments the doors 208, 209 can be moved to the open position to facilitate loading of and/or partitioning of the cargo space 320, and can be moved to the closed position during transit of the cargo pod 100.

The doors 210, 211 can operate similarly to provide secure access to only a portion of the interior cargo space of the second side portion 206. In some embodiments, the first side portion 204 of the cargo pod 100 can have a depth $D_1$ (FIG. 2) that is greater than a depth $D_2$ (FIG. 2) of the second side portion 206 of the cargo pod 100. For example, the depth $D_1$ can be between about 15-25 inches (e.g., about 21 inches) and the depth $D_2$ can be between about 10-20 inches (e.g., about 16 inches). Therefore, the cargo space 320 can have a greater volume than the cargo space of the second side portion 206. In some embodiments, the cargo pod 100 can be positioned within the vehicle 102 such that the first side portion 204 faces the curb side of a road while the second side portion 206 faces the street side of the road. In some such embodiments, relatively larger and/or heavier items (which may be more difficult for a delivery recipient to remove from the cargo pod 100) can be positioned in the curb-side portion 204 of the cargo pod 100, and relatively smaller and/or lighter items can be positioned in the street-side portion 206 of the cargo pod 100. Similarly, in some embodiments items to be delivered to a delivery location on a street can preferentially be placed in the curb-side portion 204, while items to be delivered to a delivery location other than a street (e.g., to a parking lot, warehouse, driveway, etc.) can be preferentially placed in the street-side portion 206 to minimize deliveries that require a user to enter the street.

Figure 4B:
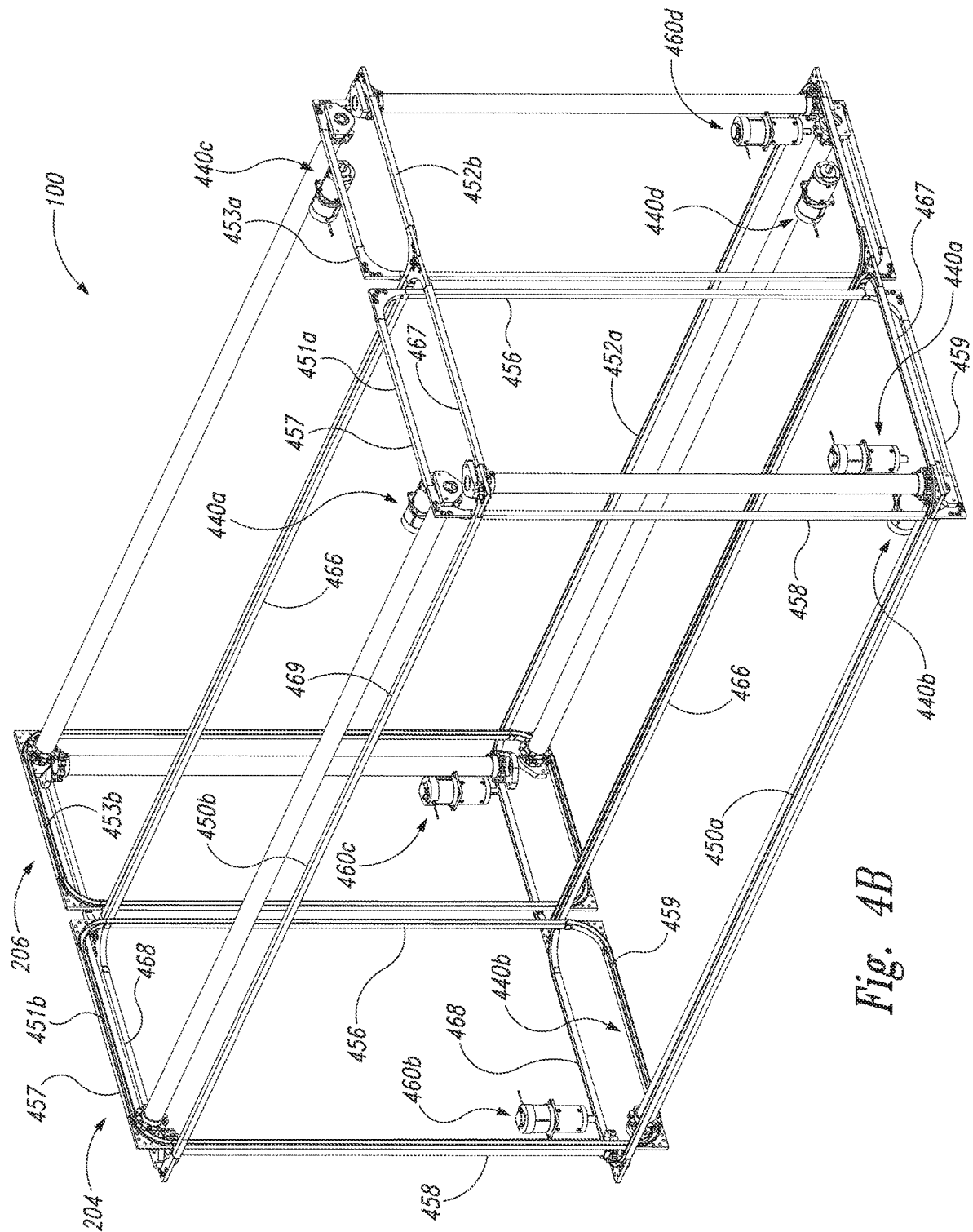

FIGS. 4A-4H illustrate various features of a door drive system 400 of the cargo pod 100 configured to move the doors 208-211 in the manner described in detail above. For example, FIGS. 4A and 4B are isometric views of the cargo pod 100 illustrating the door drive system 400 in accordance with embodiments of the present technology. For the sake of clarity, the doors 208-211, the rear panel 318b, and the lower panel 318c are not shown in FIGS. 4A and 4B, and the framework 202 is also not shown in FIG. 4B. Referring to FIGS. 4A and 4B together, the door drive system 400 includes a plurality of vertical door drive mechanisms 440 (identified individually as first through fourth vertical door drive mechanisms 440a-d) and a plurality of horizontal door drive mechanisms 460 (identified individually as first through fourth horizontal door drive mechanisms 460a-d).

As best seen in FIG. 4B, the door drive system 400 further includes (i) a first pair of horizontal tracks 450 (identified individually as a first horizontal track 450a and a second horizontal track 450b) and a first pair of vertical tracks 451 (identified individually as first (lower) vertical track 451a and a second (upper) vertical track 451b) coupled to the first side portion 204 of the framework 202, and (ii) a second pair of horizontal tracks 452 (identified individually as a first horizontal track 452a and a second horizontal track 452b)

and a second pair of vertical tracks 453 (identified individually as a first vertical track 453a and a second vertical track 453b) coupled to the second side portion 206 of the framework 202. In some embodiments, the tracks 450-453 can be integrally formed with the framework 202 and/or coupled to other portions/components of the cargo pod 100.

Referring to FIGS. 2, 4A, and 4B together, the horizontal tracks 450, 452 are configured to movably (e.g., slidably) receive and constrain edge portions of the horizontal doors 208, 210, respectively, and the vertical tracks 451, 453 are configured to movably (e.g., slidably) receive and constrain edge portions of the vertical doors 209, 211, respectively. For example, the tracks 450-453 can each define a U-shaped channel or groove configured to receive the edge portions of the corresponding doors 208-211 therein. As discussed in greater detail below, the horizontal door drive mechanisms 460 are configured to drive corresponding ones of the horizontal doors 208, 210 at least partially along the horizontal tracks 450, 452, and the vertical door drive mechanisms 440 are configured to drive corresponding ones of the vertical doors 209, 211 at least partially along the vertical tracks 451, 453.

In the illustrated embodiment, each pair of the tracks 450-453 is coupled to the framework 202 such that the individual tracks in each pair are generally parallel to and face one another. Moreover, in the illustrated embodiment the tracks 450-453 each form a continuous loop having a generally rectangular shape (e.g., including linear portions separated by curved portions) that enables the doors 208-211 to smoothly move along the tracks 450-453. In some embodiments, the vertical tracks 451, 453 are positioned inside of the horizontal tracks 450, 452, respectively. Accordingly, the vertical doors 209, 211 can be offset (e.g., positioned inside of; as shown in FIG. 2) the horizontal doors 208, 210, respectively, such that the vertical doors 209, 211 do not contact or intersect the horizontal doors 208, 210 during operation of the door drive system 400. In other embodiments, the horizontal tracks 450, 452 can be positioned within/inside the vertical tracks 451, 453. In yet other embodiments, some or all of the tracks 450-453 need not form a continuous loop. For example, the cargo pod 100 can include individual tracks (e.g., eight pairs of tracks) that each receive and constrain an individual one of the doors 208-211. In some embodiments, all or a portion of the tracks 450-453 can be 3D-printed to, for example, enable custom fitting/sizing based on the dimensions of the framework 202.

Figure 4C:
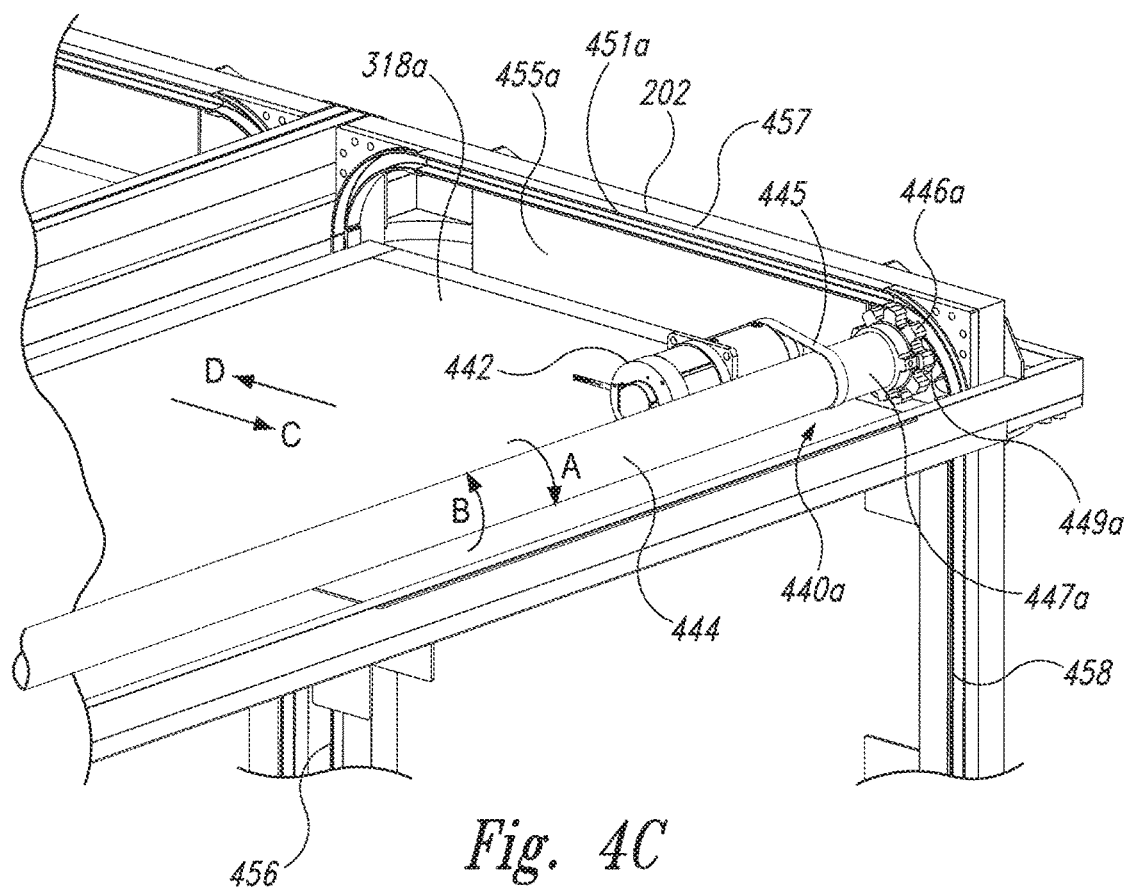
FIGS. 4C and 4D are enlarged isometric views of portions of the cargo pod illustrating a vertical door drive mechanism and vertical tracks configured in accordance with embodiments of the present technology.
Figure 4D:
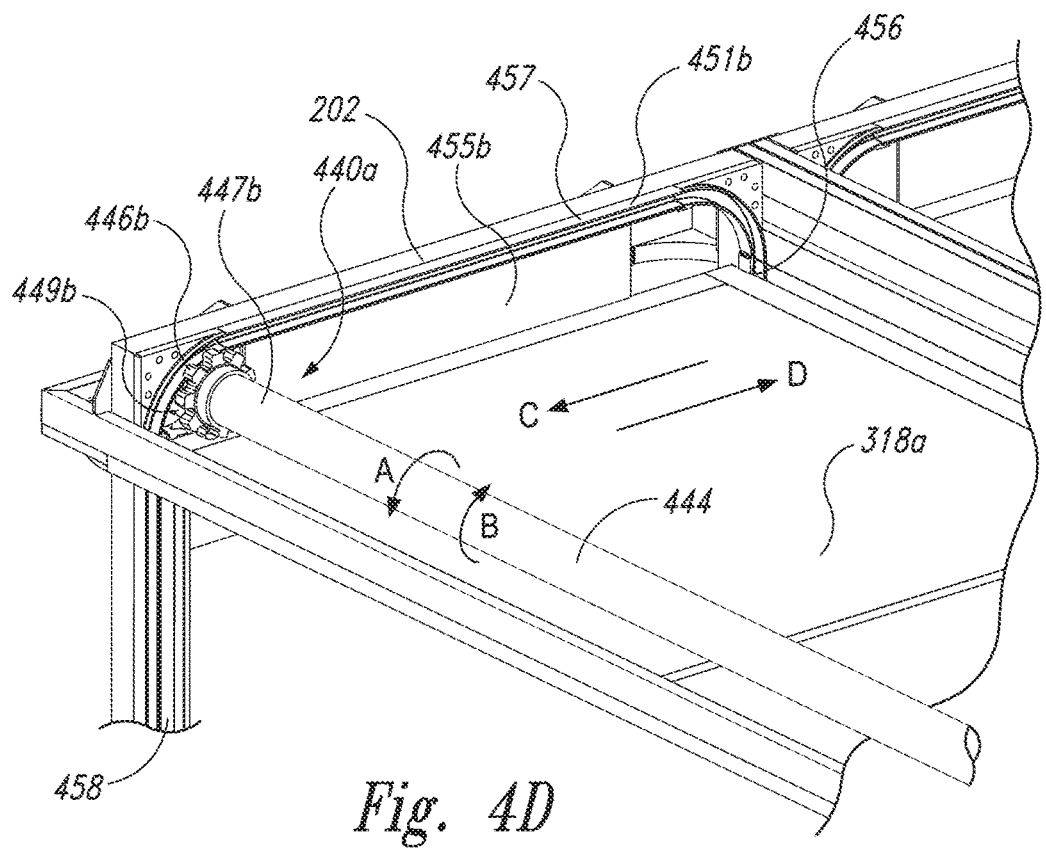

FIGS. 4C and 4D are enlarged isometric views of portions the cargo pod 100 shown in FIG. 4A and illustrating the first vertical door drive mechanism 440a and the vertical tracks 451 in accordance with embodiments of the present technology. In general, the features and configurations of the second through fourth vertical door drive mechanisms 440b-440d can be generally similar or identical. In some embodiments, for example, all of the vertical door drive mechanisms 440 can have the same components but can be positioned in a different portion of the cargo pod 100 and/or individual components can be sized differently to drive the corresponding ones of the vertical doors 209, 211. Accordingly, while the details of the first vertical door drive mechanism 440a are described in detail with reference to FIGS. 4A-4D, one of ordinary skill in the art will understand that the second through fourth vertical door drive mechanisms 440b-440d can have the same or substantially similar features.

Referring to FIGS. 4C and 4D together, the first vertical door drive mechanism 440a includes a motor 442 (e.g., an electric motor) coupled to a drive shaft 444 via a drive belt 445. In the illustrated embodiment, the motor 442 is attached to the upper panel 318a and the drive shaft 444 is rotatably coupled to the framework 202. More particularly, the drive shaft 444 can have a first end portion 447a that engages a first mount 449a on a corresponding first corner portion of the framework 202, and a second end portion 447b opposite the first end portion 447a that engages a second mount 449b on an opposite corner portion of the framework 202. The mounts 449 can be bearing mounts or other suitable mounts for rotatably mounting the drive shaft 444 to the framework 202. A first sprocket 446a can be fixedly coupled to the drive shaft 444 at or near the first end portion 447a, and a second sprocket 446b can be coupled to the drive shaft 444 at or near the second end portion 447b. In the illustrated embodiment, the sprockets 446 include a plurality of teeth or cogs that are configured to engage the first vertical door 209a (FIG. 2) to transfer a rotational force generated by the motor 442 to the first vertical door 209a, as described in greater detail below with reference to FIG. 4E.

In the illustrated embodiment, the first vertical track 451a is mounted to a first inner-facing surface 455a of the framework 202 (e.g., a combined surface of multiple ones of the elongate members 316; FIG. 3A) and the second vertical track 451b is mounted to a second inner-facing surface 455b of the framework 202 to face and generally oppose the first vertical track 451a. Referring to FIGS. 3A and 4B-4D together, the vertical tracks 451 can each include (i) a first portion 456 that extends generally vertically (e.g., in a direction between the upper and lower panels 318a, c) along the framework 202 behind and/or proximate to the rear panel 318b, (ii) a second portion 457 that extends generally horizontally (e.g., generally parallel to the upper panel 318a) along the framework 202 above and/or proximate to the upper panel 318a, (iii) a third portion 458 that extends generally vertically along the framework 202 in front of and/or proximate to the opening 321 of the cargo space 320, and a (iv) a fourth portion 459 that extends generally horizontally (e.g., generally parallel to the lower panel 318c) along the framework 202 below and/or proximate to the lower panel 318c. Moreover, the vertical tracks 451 can be smoothly curved (e.g., rounded) at the corners between the portions 456-459.

Figure 4E:
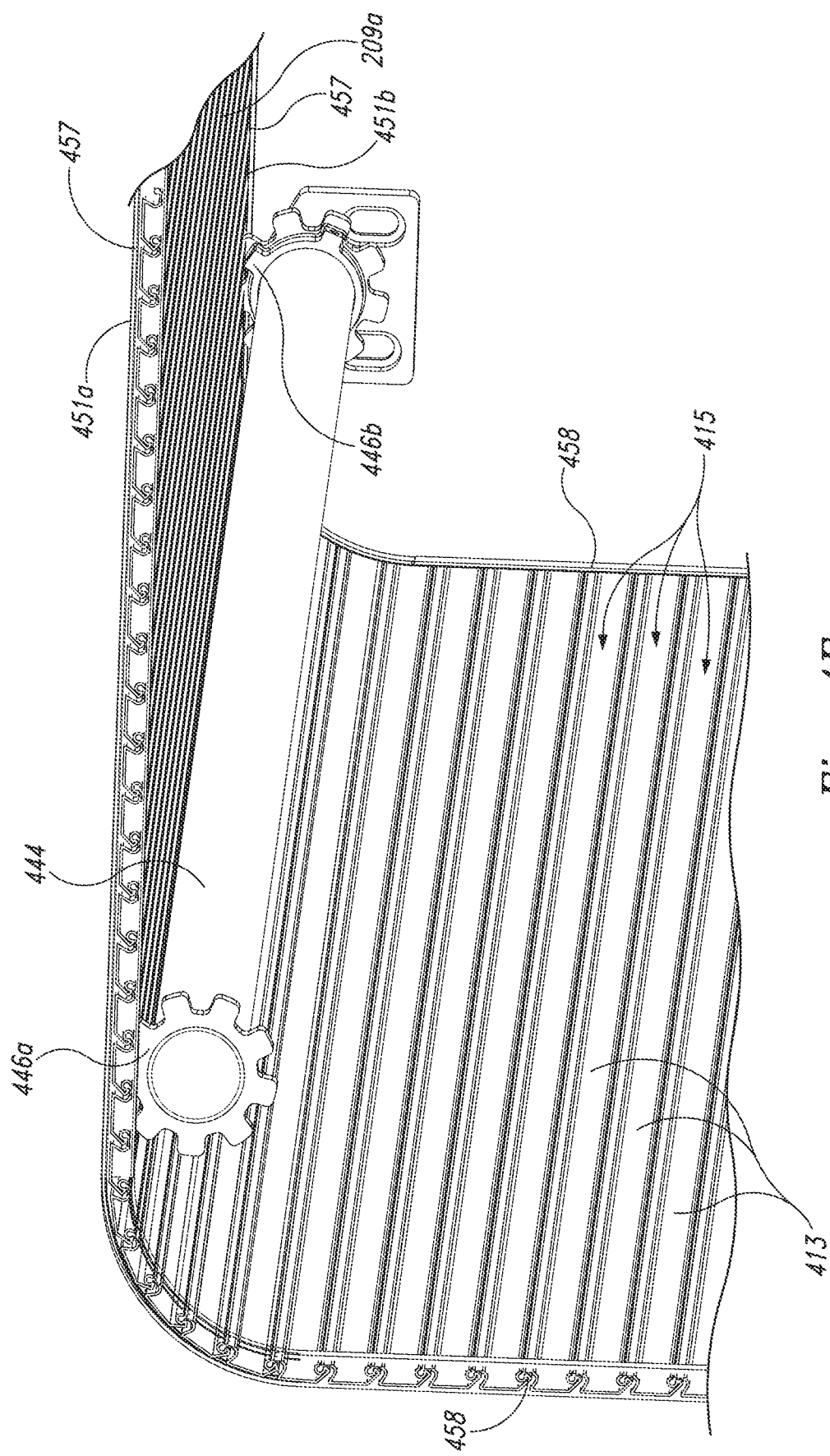
FIG. 4E is an isometric view of a portion of a vertical door of the cargo pod movably constrained within the vertical tracks of FIGS. 4C and 4D in accordance with an embodiment of the present technology.

The vertical tracks 451 are configured to slidably receive and secure the first vertical door 209a to permit the first vertical door 209a to be moved over/across the opening 321 of the cargo space 320. For example, FIG. 4E is an isometric view of the first vertical door 209a with the edge portions of the first vertical door 209a slidably constrained within the vertical tracks 451 (e.g., constrained within the second and third portions 457, 458 of the vertical tracks 451). As further shown in FIG. 4E, the first vertical door 209a can comprise a plurality of slats 413 that are pivotally, rotatably, or otherwise movably coupled together such that the first vertical door 209a can bend or flex as it moves along the vertical tracks 451. Some or all of the slats 413 can define channels or grooves 415 (e.g., U-shaped extrusion grooves) that are configured to be engaged by the teeth of the sprockets 446. Moreover, in the illustrated embodiment the sprockets 446 are positioned near the end portions 447 of the drive shaft 444 such that they engage the slats 413 of the first vertical door 209a proximate to opposite ends of the slats 413. This allows the drive shaft 444 to drive the first vertical door 209a generally evenly from both sides of the first vertical door 209a which can inhibit or even prevent "racking" or other unwanted (e.g., side-to-side) movement of the first vertical door 209a during operation. In some embodiments, each of the doors 208-211 can have the same or a similar construction as the first vertical door 209a illustrated in FIG. 4E.

Referring to FIGS. 3A and 4B-4E together, in operation, the motor 442 is configured to drive the drive belt 445 to rotate the drive shaft 444 in either a first direction A (indicated by the arrow A in FIGS. 4C and 4D) or a second direction B (indicated by the arrow B in FIGS. 4C and 4D). Rotation of the drive shaft 444 in the first direction A causes the sprockets 446 to engage with the slats 413 of the first vertical door 209a and to drive the first vertical door 209a along the vertical tracks 451 in a direction C (indicated by the arrow C in FIGS. 4C and 4D) from the first portions 456 toward the third portions 458 of the tracks 450. Conversely, rotation of the drive shaft 444 in the second direction B causes the sprockets 446 to engage with the slats 413 of the first vertical door 209a and to drive the first vertical door 209a along the vertical tracks 451 in an opposite direction D (indicated by the arrow D in FIGS. 4C and 4D)—from the third portions 458 toward the first portions 456 of the tracks 450. Thus, rotating the drive shaft 444 in the first direction A causes the first vertical door 209a to extend over more of the opening 321 of the cargo space 320, while rotation of the drive shaft 444 in the second direction B causes the first vertical door 209a to retract from and extend over less of the opening 321 of the cargo space 320. In some embodiments, the length of the vertical tracks 451 and/or the length of the first vertical door 209a can be selected such that the first vertical door 209a is movable between a first position in which the first vertical door 209a covers the entire opening of the cargo space 320 (i.e., the first vertical door 209a is positioned along the entire lengths of the third portions 458 of the vertical tracks 451) to a second position in which the first vertical door 209a does not cover any of the opening 321 of the cargo space 320 (i.e., the first vertical door 209a is positioned only along the first, second, and/or fourth portions 456, 457, 459 of the vertical tracks 451).

Figure 4F:
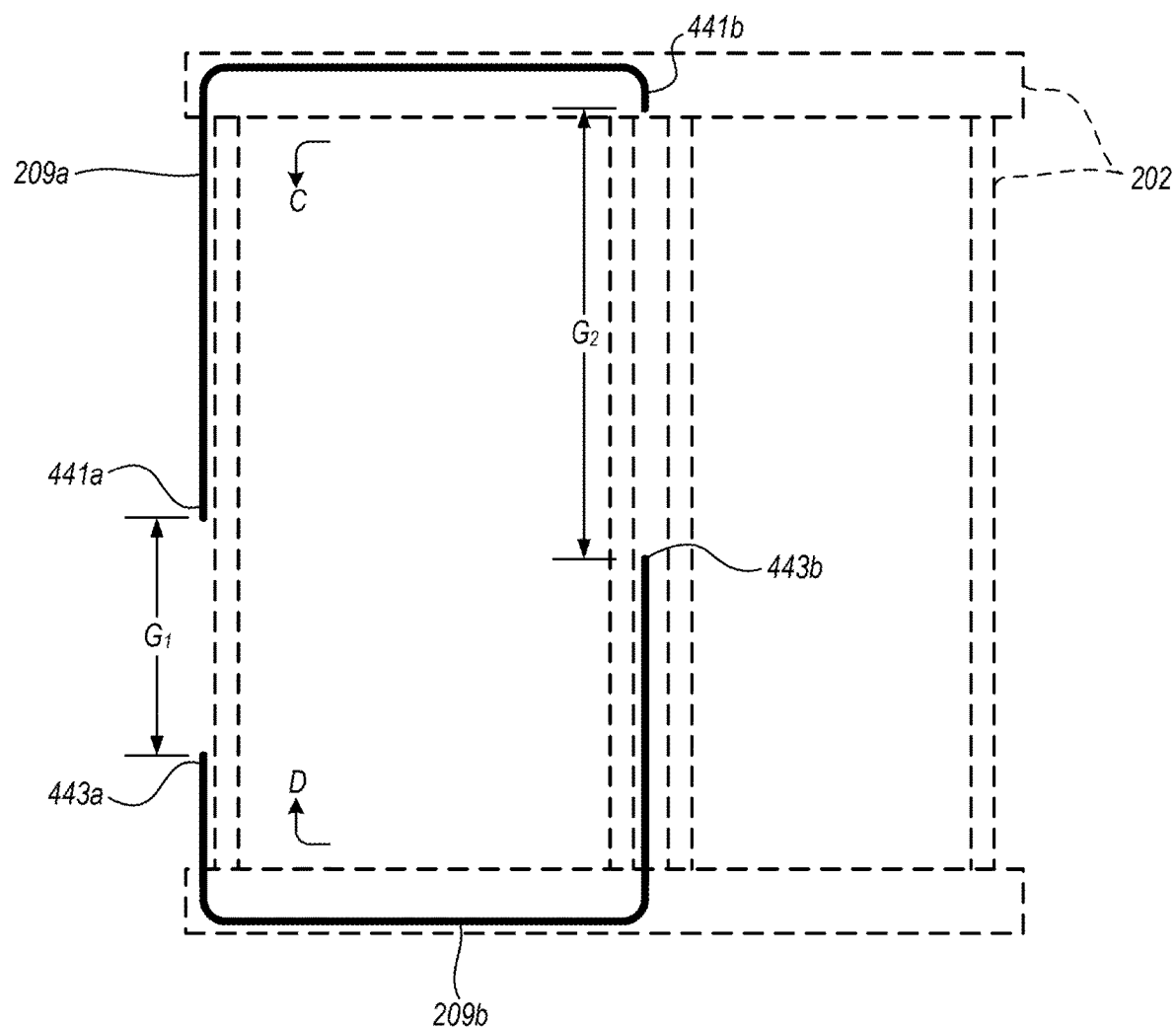
FIG. 4F is a side view of the cargo pod configured in accordance with an embodiment of the present technology.

FIG. 4F is a side view of the cargo pod 100 illustrating the vertical doors 209 and the framework 202 in accordance with embodiments of the present technology. The framework 202 is shown in phantom lines in FIG. 4F for the sake of clarity. As shown in FIG. 4F, the first vertical door 209a can have a first end portion 441a and a second end portion 441b, and the second vertical door 209b can have a first end portion 443a and a second end portion 443b. The vertical doors 209 together define a first gap G1 between the first end portion 441a of the first vertical door 209a and the first end portion 443a of the second vertical door 209b, and a second gap G2 between the second end portion 441b of the first vertical door 209a and the second end portion 443b of the second vertical door 209b. When one or both of the vertical doors 209 are driven by the vertical door drive mechanisms 440a, b, the size (e.g., length) and/or position of the gaps G1 and G2 can vary accordingly (e.g., along the vertical tracks 451; FIGS. 4B-4O). For example, the gap G1 decreases and the gap G2 correspondingly increases when the first vertical door 209a is moved in the direction C (e.g., to cover more of the opening 321 of the cargo space 320; FIG. 3A) while the second vertical door 209b is advanced in the direction D or maintained stationary. Conversely, the gap G1 increases and the gap G2 correspondingly decreases when the first vertical door 209a is retracted in the direction D (e.g., to cover less of the opening 321 of the cargo space 320; FIG. 3A) while the second vertical door 209b is retracted in the direction C or maintained stationary.

In some embodiments, the vertical doors 209 can be driven into abutment with one another. For example, the first end portion 441a of the first vertical door 209a can contact the first end portion 443a of the second vertical door 209b (i.e., so there is no gap G1) to, for example, prevent access to the cargo space 320. In general, the length of the vertical doors 209 can be selected to enable their movement along more or less of the vertical tracks 451 (FIGS. 4B-4O) relative to one another. For example, one or both of the doors can have a length that is less than or equal to about 50%, about 25%, about 20%, etc., of a circumference of the vertical tracks 451. In some embodiments, each of the doors 208, 210, and 211 can have the same or a similar construction as the vertical doors 209 illustrated in FIG. 4F.

Figure 4G:
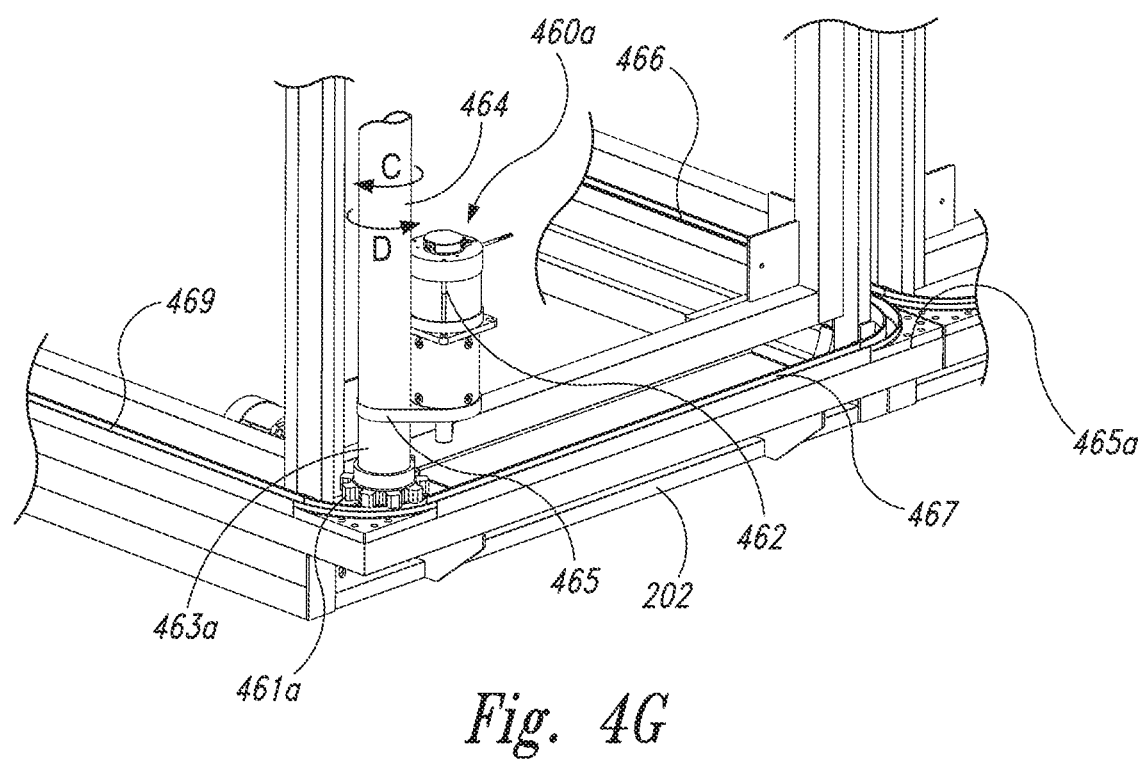
FIGS. 4G and 4H are enlarged isometric views of portions of the cargo pod illustrating a horizontal door drive mechanism and horizontal tracks configured in accordance with embodiments of the present technology.
Figure 4H:
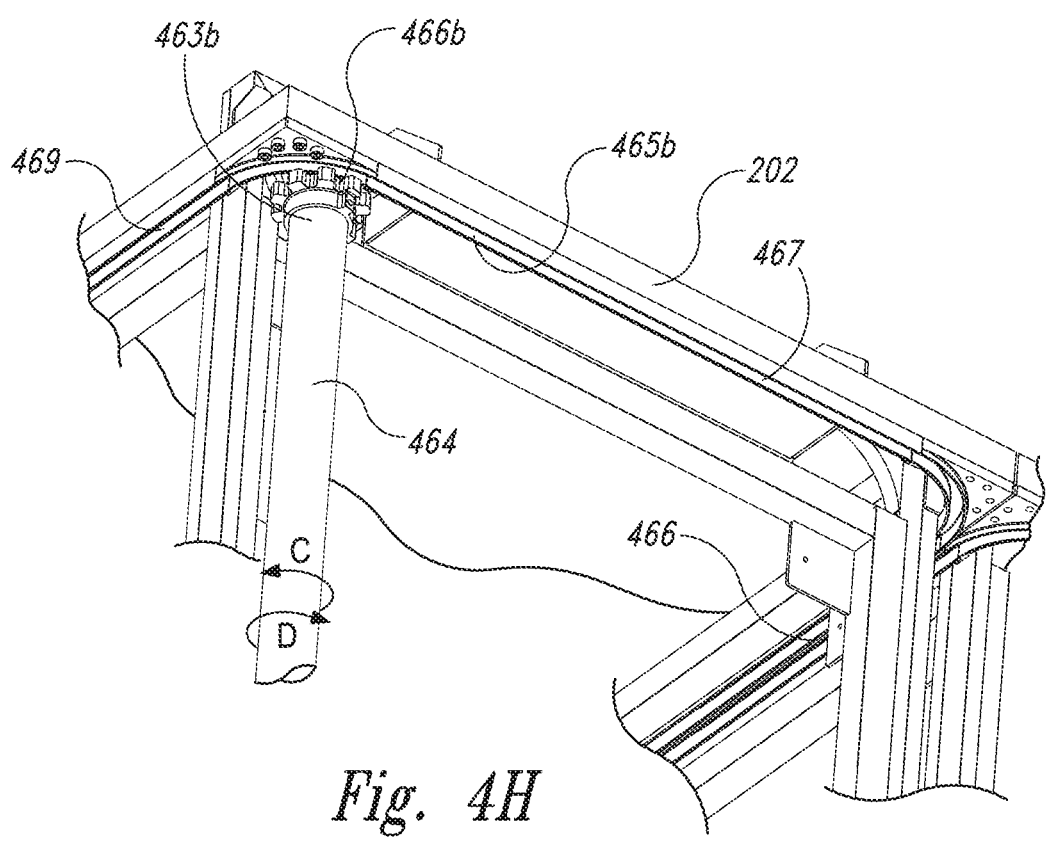

FIGS. 4G and 4H are enlarged isometric views of portions of the cargo pod 100 shown in FIG. 4A and illustrating the first horizontal door drive mechanism 460a and the horizontal tracks 450 in accordance with embodiments of the present technology. The features and configurations of each of the horizontal door drive mechanisms 460 can be generally similar or identical to one another and/or to the vertical door drive mechanisms 440 described in detail above. For example, referring to FIGS. 4G and 4H together, the first horizontal door drive mechanism 460a includes a motor 462 (e.g., an electric motor) coupled to a drive shaft 464 via a drive belt 465. The motor 462 can be mounted to the second side panel 318e (FIG. 3A) and/or to the framework 202, and end portions of the drive shaft 464 can be rotatably coupled to the framework 202 via rotatable mounts on the framework 202. A first sprocket 461a can be coupled to the drive shaft 464 at or near a first end portion 463a of the drive shaft 464, and a second sprocket 461b can be coupled to the drive shaft 464 at or near a second end portion 463b of the drive shaft 464. The sprockets 461 include a plurality of teeth or cogs that can engage slats of the first horizontal door 208a to transfer a rotational force generated by the motor 462 to the first horizontal door 208a.

The first horizontal track 450a is mounted to an upward-facing surface 465a of the framework 202 (e.g., a combined surface of multiple ones of the elongate members 316) and the second horizontal track 450b is mounted to an opposite downward-facing surface 465b of the framework 202 to face and generally oppose the first horizontal track 450a. Referring to FIGS. 3A, 4B, 4G, and 4H together, the horizontal tracks 450 can each include (i) a first portion 466 that extends along the framework 202 behind and/or proximate to the rear panel 318b (e.g., generally parallel to the rear panel 318b), (ii) a second portion 467 that extends along the framework 202 behind and/or proximate to the second side panel 318e (e.g., generally parallel to the second side panel 318e), (iii) a third portion 468 that extends along the framework 202 behind and/or proximate to the first side panel 318d (e.g., generally parallel to the first side panel 318d), and (iv) a fourth portion 469 that extends along the framework 202 generally in front of and/or proximate to the opening 321 of the cargo space 320.

In operation, the motor 462 is configured to drive the drive belt 465 to rotate the drive shaft 464 in either a first direction E (as indicated by the arrow E in FIGS. 4G and 4H) or a second direction F (indicated by the arrow F in FIGS. 4G and 4H). Rotation of the drive shaft 464 in the first direction causes the sprockets 461 to engage with the slats of the first horizontal door 208a and to drive the first horizontal door 208a along the horizontal tracks 450 and to cover more of the opening 321 cargo space 320 (e.g., in a direction from the first portions 466 toward the fourth portions 469 of the tracks 450). Conversely, rotation of the drive shaft 464 in the second direction causes the sprockets 461 to engage with the first horizontal door 208a to drive the first horizontal door 208a along the horizontal tracks 450 in the opposite direction and to cover less of the opening 321 of the cargo space 320 (e.g., in a direction from the fourth portions 469 toward the first portions 466 of the tracks 450). In some embodiments, the first horizontal door drive mechanism 460a can drive the first horizontal door 208a from a first position in which the first horizontal door 208a covers the entire opening of the cargo space 320 (i.e., the first horizontal door 208a is positioned along the entire lengths of the fourth portions 469 of the horizontal tracks 450) to a second position in which the first horizontal door 208a does not cover any of the opening 321 of the cargo space 320 (i.e., the first horizontal door 208a is positioned only along the first, second, and/or third portions 466, 467, 468 of the horizontal tracks 450).

III. Selected Embodiments of Suitable Computing Environments

Figure 5:
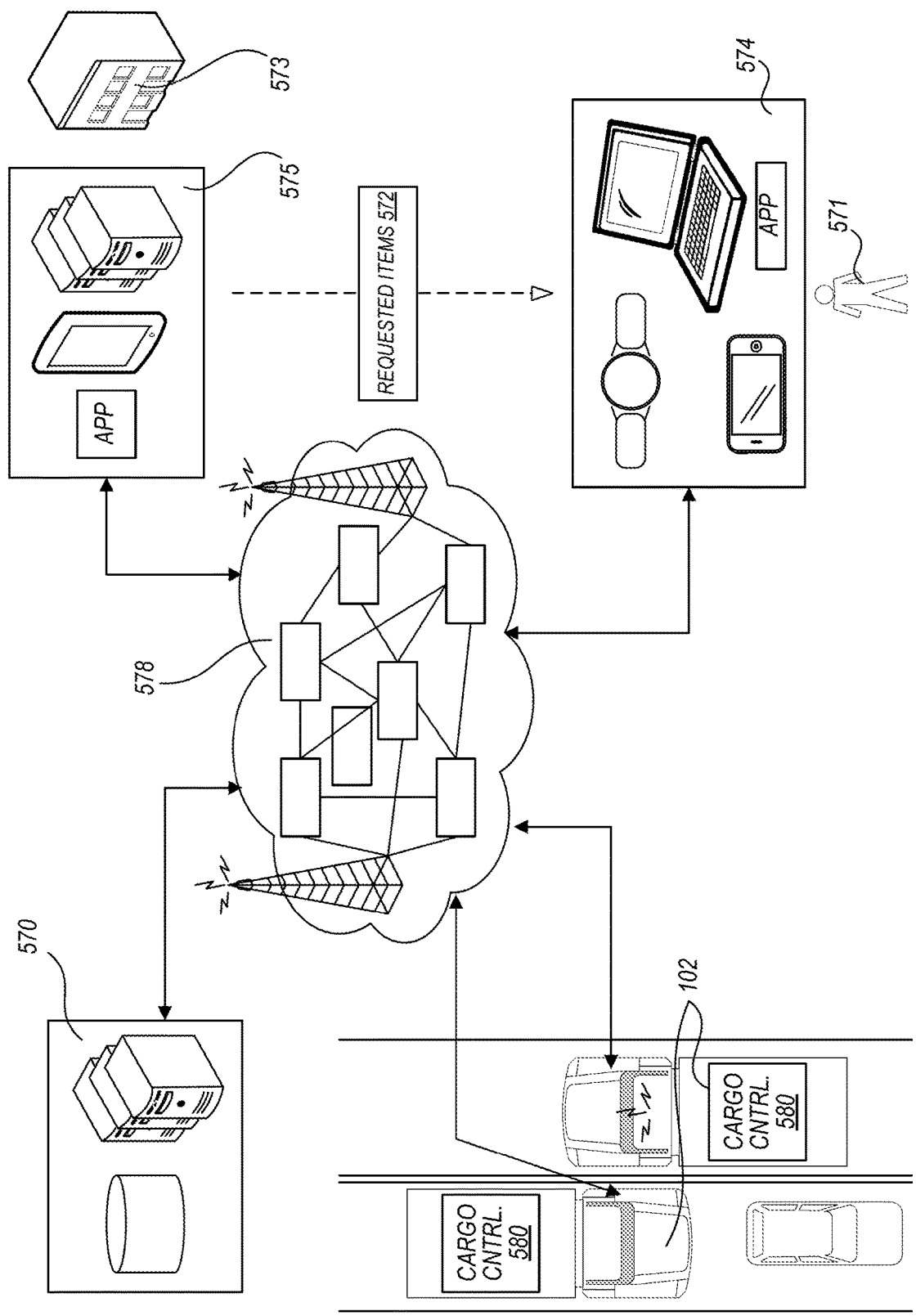
FIG. 5 is a schematic illustration of an environment in which a system for managing deliveries may operate in accordance with an embodiment of the present technology.

FIG. 5 the following discussion provide a brief, general description of a suitable environment in which a in which a system for managing deliveries may operate in accordance with an embodiment of the present technology. Although not required, aspects of the present technology are described in the general context of computer-executable instructions, such as routines executed by a general-purpose computer, a personal computer, a server, or other computing system. The present technology can also be embodied in a special purpose computer or data processor that is specifically programmed, configured, or constructed to perform one or more of the computer-executable instructions explained in detail herein. Indeed, the terms "computer" and "computing device," as used generally herein, refer to devices that have a processor and non-transitory memory, like any of the above devices, as well as any data processor or any device capable of communicating with a network. Data processors include programmable general-purpose or special-purpose microprocessors, programmable controllers, application-specific integrated circuits (ASICs), programming logic devices (PLDs), graphics processing units (GPUs), or the like, or a combination of such devices. Computer-executable instructions may be stored in memory, such as random access memory (RAM), read-only memory (ROM), flash memory, or the like, or a combination of such components. Computer-executable instructions may also be stored in one or more storage devices such as magnetic or optical-based disks, flash memory devices, or any other type of non-volatile storage medium or non-transitory medium for data. Computer-executable instructions may include one or more program modules, which include routines, programs, objects, components, data structures, and so on that perform particular tasks or implement particular abstract data types.

Aspects of the present technology can also be practiced in distributed computing environments, where tasks or modules are performed by remote processing devices linked through a communications network including, but not limited to, a Local Area Network (LAN), Wide Area Network (WAN), or the Internet. In a distributed computing environment, program modules or subroutines may be located in both local and remote memory storage devices. Aspects of the present technology may be stored or distributed on tangible, non-transitory computer-readable media, including magnetic and optically readable and removable computer discs, or stored in firmware in chips (e.g., EEPROM chips). Alternatively, aspects of the present technology may be distributed electronically over the Internet or over other networks (including wireless networks). Those skilled in the relevant art will recognize that portions of the present technology may reside on a server computer while corresponding portions reside on a client computer.

Referring to FIG. 5, a delivery management system 570 (e.g., one or more computing devices, such as servers, in which aspects of the present technology may operate) can connect a delivery recipient 571 (e.g., an end-user ordering items/products online or over the phone) with a merchant user 573 (e.g., an entity providing or selling the ordered items/products, such as a store or a restaurant). For example, the delivery recipient 571 can order one or more requested items 572 from the merchant user 573 such as, for example, consumer goods, food, etc.

The delivery management system 570 can connect to and/or communicate with a user device 574 (e.g., a computing device, such as a smart phone, a smart watch, a personal computer, etc.) of the delivery recipient 571, a merchant interface device 575 (e.g., a computing device, such as a server, a handheld device, etc.) of the merchant user 573, or a combination thereof. In some embodiments, the delivery management system 570 can receive a request to pick up and/or deliver the requested item 572 from the user device 574 and/or the merchant interface device 575. In some embodiments, the delivery management system 570 can be within the merchant interface device 575 (e.g., at the merchant-side instead of at an external party/service provider).

The delivery management system 570 can manage operations of a single autonomous delivery vehicle (e.g., the vehicle 102 shown in FIGS. 1A and 1B) or a fleet of autonomous delivery vehicles for transporting ordered items to the corresponding delivery recipients 571. To manage the vehicle 102, the delivery management system 570 can allocate/move the vehicle 102 to specific geographic regions (by, e.g., controlling a geographic location of the vehicle 102), generate a delivery route including one or more pickup locations (e.g., locations corresponding to one or more of the merchant users 573) and one or more delivery locations (e.g., locations corresponding to one or more of the delivery recipients 571), control the vehicle 102 to traverse the delivery route, coordinate loading processes at the pickup locations, provide secure access to the ordered items at the pickup locations, or a combination thereof.

For example, the delivery management system 570 can generate a delivery mission for the vehicle 102 (e.g., a computer task for providing physical access to the requested item(s) 572 by the delivery recipient 571) based on one or more requests to pick up and/or deliver the requested items 572. The delivery management system 570 can generate the delivery mission based on each order, each recipient, each pickup location, each delivery location, or a combination thereof. In some embodiments, the generated delivery mission can include instructions for executing tasks such as, for example, picking up the requested items 572 from one or more pickup locations (e.g., one or more merchants), traversing a route to one or more delivery locations, and/or for providing secure access to the requested items 572 by the delivery recipients 571 at the delivery locations. That is, the delivery mission can include instructions for picking up one or more items from one or more pickup locations and for delivering the one or more items to a single recipient or to multiple recipients at one or more delivery locations. The delivery management system 570 can execute the instructions to assign/move the vehicle 102 to perform the tasks including traversing a route from the pickup location(s) to the delivery location(s). In some embodiments, the delivery management system 570 can execute the instructions to assign/move one of a fleet of the vehicles 102 to traverse the delivery route based on information about the vehicles 102 allocated to a specific geographic zone, such as the zone that includes the pickup location(s), the delivery location(s), or a combination thereof.

The delivery management system 570, the user device 574, and/or the merchant interface device 575 can be connected to each other through a network 578 (e.g., the communication network). The network 578 can include a wired and/or wireless network for communicating or exchanging data. For example, the network 578 can include local area networks (LAN), wide area networks (WAN), wireless fidelity (WiFi) network, cellular network (e.g., fourth generation (4G) Long Term Evolution (LTE), fifth generation (5G) communication network, or other networks), fiber optic networks, cellular network, satellite network, telephone network, the Internet, or a combination thereof. The network 578 can further include communication devices, such as access points, routers, servers, switches, repeaters, base stations, etc., that facilitate the communication between end-point devices (e.g., the delivery management system 570, the user device 574, and/or the merchant interface device 575). In some embodiments, the network 578 can include mechanisms for device-to-device communication, such as according to Bluetooth, Near-Field Communication (NFC), Dedicated Short-Range Communications (DSRC), etc.

In some embodiments, the delivery management system 570 can further connect to and/or communicate with a cargo control system 580 associated with the cargo pod 100 and/or the vehicle 102. For example, in some embodiments the delivery management system 570 can communicate with the cargo control system 580 to coordinate loading of the cargo pod 100, specify a configuration of the cargo pod 100 (e.g., an arrangement of compartments or other partitioning of a cargo space of the cargo pod 100), receive information about items positioned in the cargo pod 100, control or instruct the cargo pod 100 to provide secure access to the items positioned therein, etc.

Figure 6:
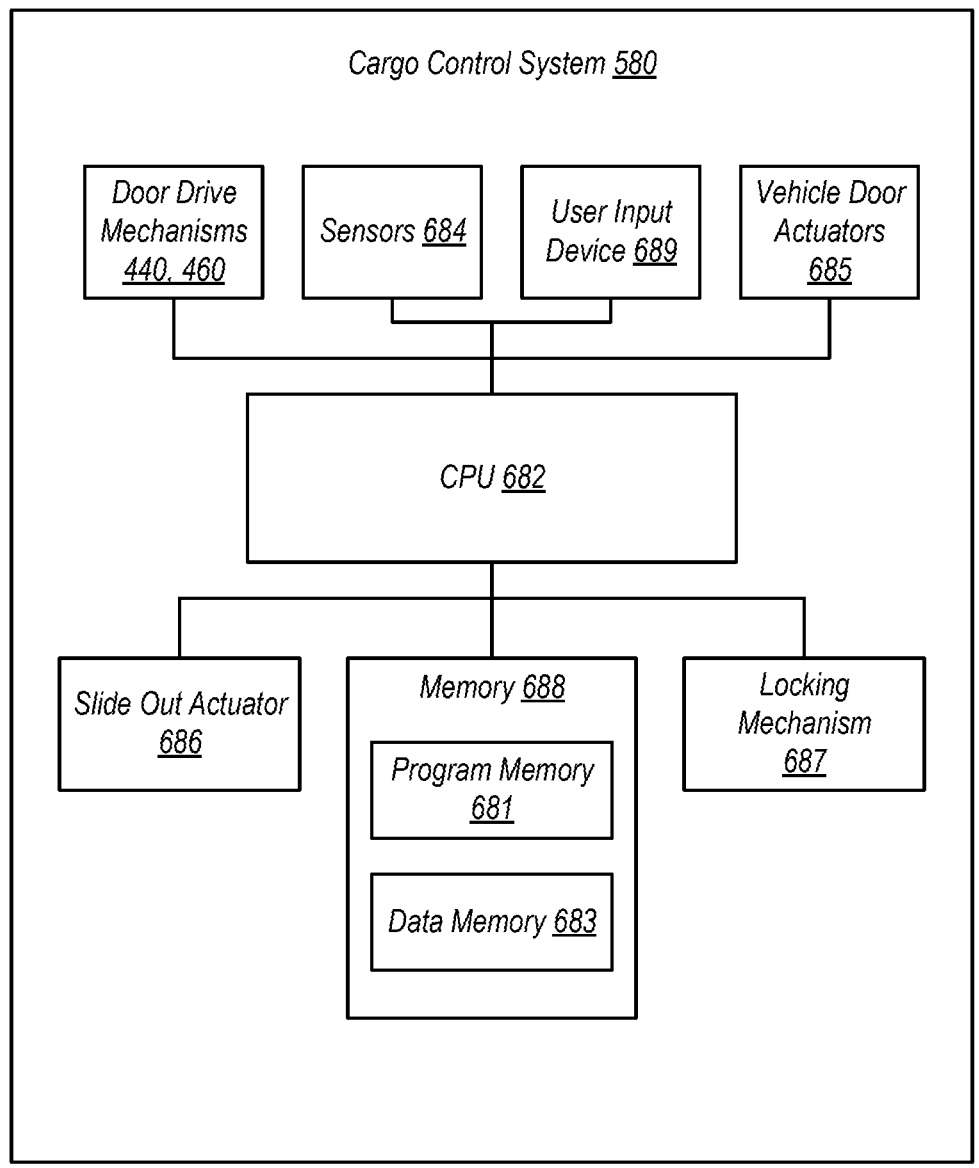
FIG. 6 is a block diagram of a cargo control system configured in accordance with an embodiment of the present technology.

More specifically, FIG. 6 is a block diagram of a cargo control system 580 on which some implementations of the present technology can operate in accordance with embodiments of the present technology. Some aspects of the cargo control system 580 are described below with reference to the cargo pod 100 described in detail above with reference to FIGS. 1A-4G.

In the illustrated embodiment, the cargo control system 580 includes a CPU (e.g., processor, microcontroller, etc.) 682 configured to receive inputs from various sensors and to control operation of the cargo pod 100 and/or portions of the vehicle 102. The CPU 682 can be a single processing unit or multiple processing units in a device or distributed across multiple devices. For example, the CPU 682 can include multiple processing units, some of which are positioned in/on the cargo pod 100 and some of which are positioned in the vehicle 102 and/or remote from the vehicle 102 (e.g., at the delivery management system 570). The CPU 682 can communicate with one or more hardware controllers for devices and can be coupled to the hardware controllers, for example, with the use of a bus, such as a PCI bus or SCSI bus.

In the illustrated embodiment, the CPU 682 receives input from sensors 684 positioned in and/or proximate to the cargo pod 100. For example, the CPU 682 can receive information from the load sensors 336 indicative of the position/arrangement of the shelves 326 and/or any items placed thereon. In some embodiments, the CPU 682 can process the information from the load sensors 336 to determine the position/arrangement of the shelves 326 and/or the weight of items placed on the shelves 326. In some embodiments, the CPU 682 can receive information from position sensors (e.g., capacitive transducers, piezoelectric encoders, etc.) located within the cargo pod 100 for determining a position of the vertical partitions 322 and/or other components of the cargo pod 100. Also, for example, the CPU 682 can receive input from photoelectric presence sensors (e.g., light curtain sensors) configured to detect whether an object (e.g., a portion of a delivery recipient's body) is positioned in the opening of the cargo pod 100 (e.g., extending through the aperture 105) where it could be contacted/pinched by one or more of the doors 208-211.

The CPU 682 can further communicate with the vertical door drive mechanisms 440 and the horizontal door drive mechanisms 460 to control the movement of the doors 208-211 (e.g., to position the aperture 105 over a selected one of the compartments 328) in response to, for example, a user input (e.g., from a delivery recipient) or an instruction received from the delivery management system 570. For example, the delivery management system 570 can generate a door instruction in response to a request from the user device 574 (e.g., a request to provide access to the requested items 572) and communicate the door instruction to the CPU 682 which processes the instruction and coordinates movement of the doors 208-211 accordingly. More particularly, the CPU 682 can communicate with hardware controllers associated with the door drive mechanisms 440, 460 to operate the motors 442, 462. Similarly, in some embodiments the CPU 682 can communicate with one or more vehicle door actuators 685 that are configured to open/close various doors of the vehicle 102 (e.g., the side door 106 and/or the rear door 104 shown in FIGS. 1A and 1B). In the illustrated embodiment, the CPU 682 can further communicate with a slide-out actuator 686 and a locking mechanism (e.g., a solenoid plunger) 687. As described in detail above, the slide-out actuator 686 can be configured to drive the cargo pod 100 in/out of the vehicle 102 along the slide-out rails 207 and the locking mechanism can be configured to lock the cargo pod 100 to the vehicle 102 (e.g., relative to the slide-out rails 207).

In some embodiments, the cargo control system 580 can include one or more user input devices 689 that provide input to the CPU 682, notifying it of actions. The actions are typically mediated by a hardware controller that interprets the signals received from the user input devices 689 and communicates the information to the CPU 682 using a communication protocol. The user input devices 689 can include, for example, a mouse, a keyboard, a touchscreen, an infrared sensor, a touchpad, a wearable input device, a camera- or image-based input device, a microphone, and/or other user input devices. The user input devices 689 can be positioned on/in the cargo pod 100 (e.g., on the framework 202), on/in the vehicle 102 (e.g., on an external surface of the vehicle, proximate the cargo pod 100, etc.), and/or in other positions accessible to a user (e.g., a delivery recipient, merchant, etc.). In some embodiments, the user input devices 689 can be coupled to the cargo pod 100 and the CPU 682 can be configured to receive a user input via the user input devices 689 to actuate one or more of the doors 208-211 of the cargo pod 100. For example, the user input devices 689 can include a touchscreen, touchpad, or other device (not shown) that enables the user to control the operation of the doors 208-211 (e.g., to move the doors 208-211 to a fully open or a fully closed position). In some embodiments, the user input devices 689 can be configured to receive a user authentication or verification. For example, a user can enter a verification (e.g., a unique code) corresponding to a delivery item via one of the user input devices 689 and, in response, the CPU 682 can instruct the door drive mechanisms 440, 460 to drive the doors 208, 209 to position the aperture 105 over one of the compartments 328 including the delivery item. In some embodiments, the user input devices 689 can be omitted, and the CPU 682 can receive input/instructions for actuating the doors 208-211 exclusively from the delivery management system 570 and/or the user device 574, as described in detail above.

The cargo control system 580 can also include a communication device (e.g., a wireless transceiver; not shown) capable of communicating wirelessly or wire-based with the network 578. The communication device can communicate with other devices (e.g., the delivery management system 570, the user device 574, the merchant interface device 575, etc.) or a server through the network 578 using, for example, TCP/IP protocols. The cargo control system 580 can utilize the communication device to distribute operations across multiple network devices (e.g., including the delivery management system 570).

The CPU 682 can have access to a memory 688. The memory 688 can include one or more of various hardware devices for volatile and/or non-volatile storage, and can include both read-only and writable memory. For example, the memory 688 can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. The memory 688 is not a propagating signal divorced from underlying hardware and is thus non-transitory. The memory 688 can include a program memory 681 that stores programs and software, such as programs and software for selectively moving the doors 208-211 of the cargo pod 100 for providing secure access to items within the cargo space 320. The memory 688 can also include a data memory 683 that can store determinations or estimations of characteristics of various items positioned within the cargo pod 100 (e.g., weights), configurations of the cargo pod 100 (e.g., positions/arrangements of the vertical partitions 322 and the shelves 326), delivery times, loading times, etc., which can be provided to the program memory 681 or any element of the cargo control system 580.

Figure 7:
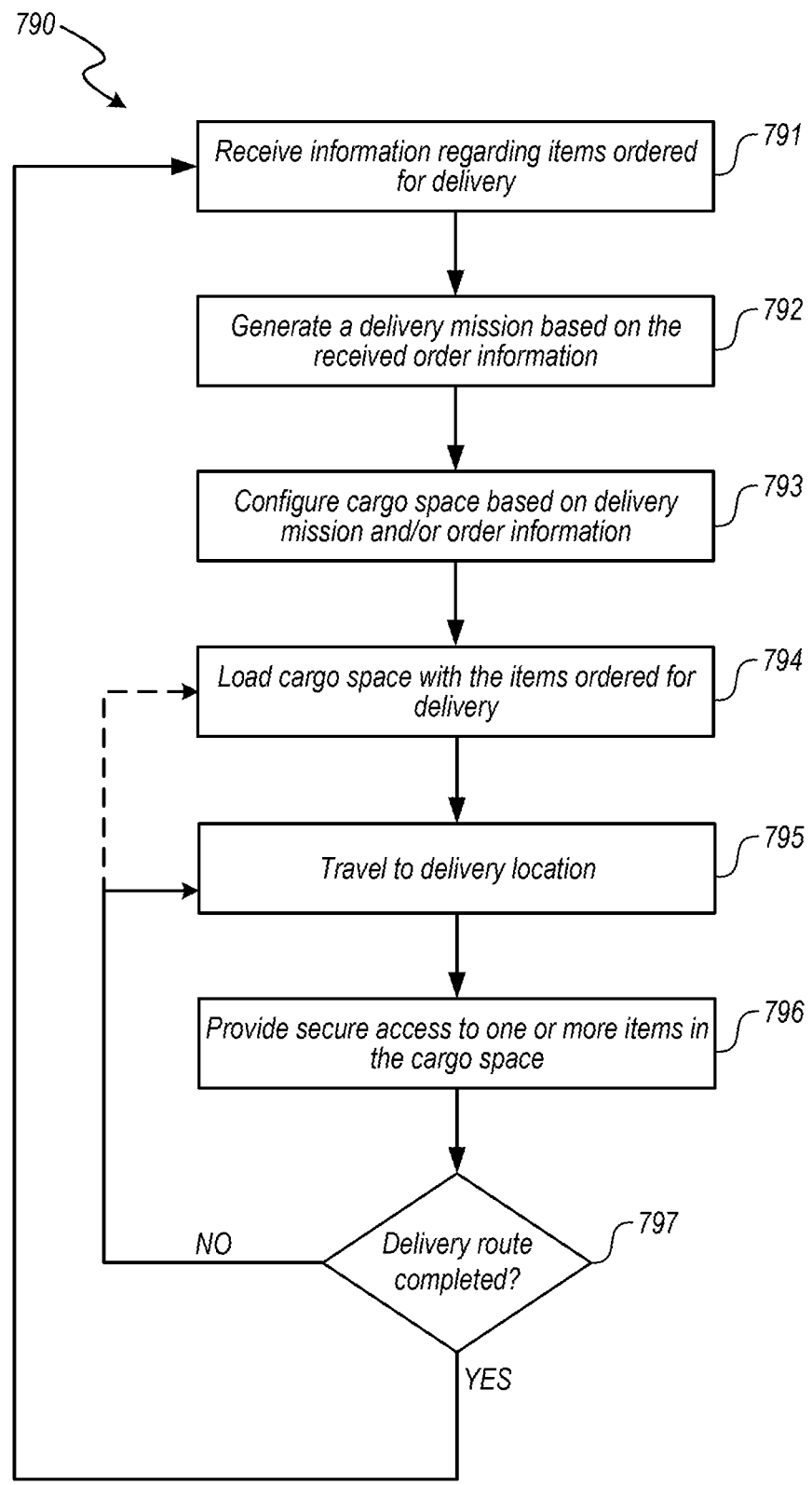
FIG. 7 is a flow diagram of a process or method for implementing automated deliveries using an autonomous vehicle in accordance with an embodiment of the present technology.

IV. Selected Embodiments of Suitable Routines for Implementing Automated Deliveries FIG. 7 is a flow diagram of a routine 790 for implementing automated deliveries using an autonomous vehicle in accordance with an embodiment of the present technology. In some embodiments, the autonomous delivery vehicle 102 of FIGS. 1A-1C, the cargo pod 100 of FIGS. 2-4G, the delivery management system 570 of FIG. 5, the cargo control system 580 of FIG. 6, or a combination thereof can implement the routine 790 illustrated in FIG. 7. Accordingly, for the sake of illustration, some features of the routine 790 will be described in the context of the embodiments shown in FIGS. 1A-6.

The routine 790 starts at block 791 by receiving information regarding items ordered for delivery ("order information"). For example, referring to FIG. 5, the delivery management system 570 can receive a delivery order representing a request from the delivery recipient 571 for delivery of the requested items 572 to a delivery location. The delivery management system 570 can receive the information directly from the delivery recipient 571 (e.g., from the user device 574), and/or can receive the order information from the merchant user 573 (e.g., a store or a restaurant providing the requested items 572) when the delivery recipient 571 orders the requested items 572 from the merchant user 573 and requests delivery thereof. In some embodiments, the delivery management system 570 can receive order information from multiple delivery recipients 571 and/or merchant users 573. The order information can include one or more of a desired pickup location, a desired delivery location, suitable or requested times for delivery and/or pickup, characteristics (e.g., size, weight, etc.) of the requested items 572, etc.

At block 792, the routine 790 includes generating a delivery mission based on the received order information. For example, the delivery management system 570 can generate a delivery mission including instructions for executing tasks such as, for example, picking up the requested items 572 from one or more pickup locations, traversing a route to one or more delivery locations, and/or for providing secure access to the requested items 572 by the delivery recipients 571 at the delivery locations.

At block 793, the routine 790 includes configuring a cargo space of the cargo pod 100 based on the generated delivery mission and/or the received order information. For example, the delivery management system 570, the cargo control system 580, a human operator, or a combination thereof can determine a configuration of the cargo space 320—such as, for example, an arrangement of the vertical partitions 322 and/or the shelves 326—that maximizes or at least enhances the volumetric efficiency of the cargo space 320 based on characteristics of the items to be delivered. For example, in some embodiments the delivery management system 570 can determine that certain ones of the shelves 326 should be removed so that one or more larger items can be fit into the cargo space 320, and/or that additional shelves 326 should be added to provide storage for additional, smaller items. The configuration of the cargo space 320 can also be based on the determined delivery route—for example, so that items intended for the same or nearby delivery locations and/or the same recipient are positioned near to one another (e.g., in adjacent ones of the cargo units 324 or compartments 328). In some embodiments, the vertical partitions 322 and/or the shelves 326 can be manually moved by a user to the determined/desired configuration while, in other embodiments, these components can be moved automatically (e.g., driven by one or more actuators).

At block 794, the routine 790 includes loading the cargo space with the items ordered for delivery. As described in detail above, in some embodiments the cargo pod 100 can be fully removed (e.g., detached) from the vehicle 102 to facilitate. Accordingly, the cargo pod 100 can be loaded with the items ordered for delivery while the cargo pod 100 is removed from and/or positioned within the vehicle 102. For example, the cargo pod 100 can be removed from the vehicle 102 at a single location (e.g., a warehouse, restaurant, etc., corresponding to the merchant user 573) and the doors 208, 209 moved to the fully open position such that each of the cargo units 324 and the compartments 328 are accessible at the same time to facilitate loading of the cargo space 320.

In some embodiments, the cargo pod 100 can be fully loaded before it is positioned within the vehicle 102. Alternatively or additionally, the doors 208, 209 can be moved to position the aperture 105 over a portion of the cargo space 320 to permit loading of only that portion of the cargo space 320. For example, while carrying the cargo pod 100, the vehicle 102 can traverse a route between different pickup locations (e.g., corresponding to different ones of the merchant users 573), and the aperture 105 can be positioned over different portions of the cargo space 320 at each pickup location as needed to permit loading by the different merchant users 573. In this manner, the routine 790 can provide for the secure loading of the cargo pod 100 by the different merchant users 573. That is, the cargo pod 100 can limit access to only a portion of the cargo space 320 for each of the merchant users 573—and prevent access to, for example, other portions of the cargo space 320 that may have been loaded previously by different ones of the merchant users 573.

At block 795, the routine 790 includes traveling to a delivery location, such as a first delivery location along a delivery route including multiple delivery locations. For example, the delivery management system 570 can instruct the vehicle 102 to traverse the delivery route.

After reaching the delivery location, at block 796 the routine 790 includes providing secure access to one or more of the items in the cargo space. For example, the cargo control system 580 can instruct the vertical door drive mechanisms 440a, b and the horizontal door drive mechanisms 460a, b to move the doors 208, 209 to position the aperture 105 over a selected/determined one or more of the compartments 328 of the cargo pod 100. In some embodiments, the cargo control system 580 can provide access to the cargo space 320 after receiving confirmation that the intended delivery recipient 571 is nearby and ready to receive their delivery. For example, the cargo control system 580 can position the aperture 105 over a corresponding one of the compartments 328 after receiving a user verification (e.g., a code sent to user device 574 by the delivery management system 570, a GPS location, etc.) from the user device 574 or from one of the user input devices 689. In some embodiments, the cargo control system 580 can further provide access to the cargo space 320 by instructing the slide-out actuator 686 to slide the cargo pod 100 at least partially out of the vehicle 102 (e.g., to provide access to rearward ones of the compartments 328 that may not be accessible through the side door 106 of the vehicle 102 as shown in FIG. 1B). After the order is retrieved, the doors 208, 209 close.

At decision block 797, the routine 790 evaluates whether the delivery route has been completed (e.g., have all items been delivered?). If the delivery route has not been completed, the method can return to block 795 and the vehicle 102 can travel to the next delivery location. In some embodiments, as shown in phantom lines, the method can return to block 794 to enable loading of additional items even if the delivery route has not been completed. That is, the routine 790 can include intermittently delivering and picking up items for delivery. For example, the generated delivery mission (block 792) can include instructions to visit a first pickup location, then to deliver items from the first pickup location to a first delivery location, and then to visit a second pickup location (e.g., a location closer to the first delivery location than the first pickup location), etc. In some embodiments, the delivery mission can be dynamically generated/updated to continuously update the delivery route.

If the delivery route has been completed, the routine 790 can end, or can return to block 791 and receive new order information. In some embodiments, after completing the delivery route, the empty cargo pod 100 can be returned to a loading facility (e.g., a warehouse) and removed from the vehicle 102. In some embodiments, another one of the cargo pods 100 that has been preloaded at the loading facility or elsewhere can then be loaded/installed into the vehicle 102, and the vehicle 102 can traverse a corresponding delivery route, as described in detail above.

V. Selected Embodiments of Autonomous Delivery Vehicles

Figure 8:
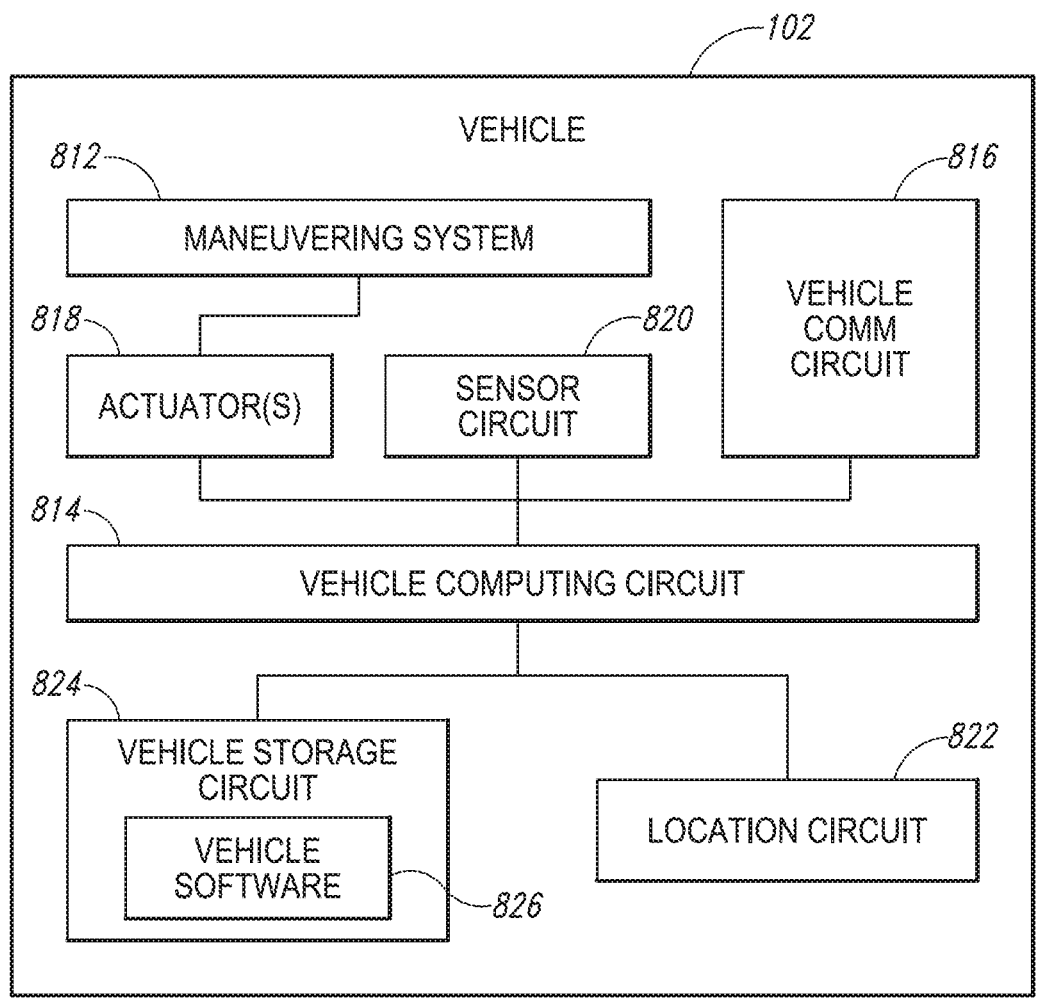
FIG. 8 is a block diagram of an autonomous delivery vehicle configured in accordance with an embodiment of the present technology.

FIG. 8 is a block diagram of an autonomous vehicle (e.g., the vehicle 102) configured in accordance with an embodiment of the present technology. In the illustrated embodiment, the vehicle 102 includes a maneuvering system 812 (e.g., a system of vehicle components configured to maneuver or physically displace the vehicle) including a propulsion mechanism (e.g., an engine or a motor), a directional mechanism (e.g., steerable wheels), a deceleration mechanism (e.g., brakes, an opposing engine or motor, etc.), and/or other related components. For example, for automobiles, the maneuvering system 812 can include a drive train (e.g., an engine and a transmission), a steering system directing orientation of one or more wheels, a brake system, an external indicator system (e.g., lights corresponding to the brake or a lane-change operation), a drive-by-wire system, or a combination thereof. In other embodiments, the vehicle 102 can be a water, amphibious, or aerial vehicle (e.g., drone), and the maneuvering system 812 could include one or of rudders, flaps, movable propulsion mounts, or other suitable components depending on the intended environment for the vehicle.

The vehicle 102 can operate the maneuvering system 812 using a vehicle computing circuit 814, a vehicle communication circuit 816, a set of actuators 818, or a combination thereof. The actuators 818 can include components for physically or mechanically moving or controlling one or more components of the maneuvering system 812. In some embodiments, the actuators 818 can be integral with the maneuvering system 812. In some embodiments the actuators 818 can be a separate subsystem that is connected to the maneuvering system 812.

The vehicle computing circuit 814 (e.g., a circuit including one or more data processors, a special purpose computer, and/or an onboard server) can control the actuators 818 according to vehicle software 826, teleoperation commands (e.g., for facilitating teleoperation of the vehicle by the remote operator), or a combination thereof. The commands, status information, and/or other inputs can be communicated between the vehicle 102 and other devices using the vehicle communication circuit 816. The vehicle communication circuit 816 can include one or more antennas, a receiver/transmitter, a modulator/demodulator, a detector, an encoder/decoder, a modem, a gateway, a switch, and/or other components that enable the vehicle to communicate with other external devices.

In some embodiments, the vehicle computing circuit 814 can execute the vehicle software 826 (e.g., computer-executable instructions) stored on a vehicle storage circuit 824 (e.g., a circuit including memory, such as volatile memory, non-volatile memory, or a combination thereof) to implement an automated driving system and/or a driver assistance system corresponding to one or more program modules. In some embodiments, the vehicle computing circuit 814 and/or the vehicle software 826 can control and communicate with delivery-related hardware, such as the cargo pod 100 (e.g., for actuating one or more of the doors of the cargo pod 100, cooling/heating content, configuring a cargo space of the cargo pod 100, etc.), a user interface, etc.

In implementing the automated driving system and/or the driver assistance system, the vehicle computing circuit 814 can autonomously generate or calculate vehicle processing results (e.g., self-generated paths, upcoming maneuvers, and/or the corresponding set points) and control the actuators 818 accordingly. The vehicle computing circuit 814 can utilize current maneuvering parameters to generate or calculate the vehicle processing results. For example, the vehicle computing circuit 814 can utilize sensor data generated by a sensor circuit 820 (e.g., a circuit including components such as a radar, a LIDAR, an inertial motion unit (IMU), an encoder, an ultrasonic sensor, a proximity sensor, a camera, a lane sensor, or a self-reporting/detecting circuitry for errors and/or set points in components or subsystems, etc.) in autonomously operating the vehicle. Also, for example, the vehicle computing circuit 814 can similarly utilize a vehicle location calculated by a location circuit 822 (e.g., a GPS positioning unit). In some embodiments, the location circuit 822 can be integral with the sensor circuit 820. In some embodiments, the vehicle computing circuit 814 can calculate the vehicle location using a dead-reckoning programming module, a WiFi-based locating module, the location circuit 822 (e.g., a GPS module), or a combination thereof.

Although the vehicle 102 is illustrated as a conventional automobile in FIGS. 1A and 1B, in general, the cargo pod 100 of the present technology can be configured to be carried by and swapped onto/into any type of autonomous over-the-road delivery vehicle. FIG. 9, for example, is a side view of a vehicle 902 configured in accordance with another embodiment of the present technology and configured to carry the cargo pod 100. The vehicle 902 can include features generally similar to the vehicle 102 described in detail above. For example, the vehicle 902 can be an over-the-road vehicle capable of operating (e.g., including maneuvering and/or traversing through physical space and/or controlling functions, components, or subsystems) according to and through its surrounding environment. Similarly, the vehicle 902 can include a maneuvering system (e.g., a system of vehicle components configured to maneuver or physically displace the vehicle) that can be operated using a vehicle computing circuit, a vehicle communication circuit, a set of actuators, or a combination thereof.

However, in the illustrated embodiment the vehicle 902 does not include any doors and instead includes a flatbed surface 981 on a chassis configured to receive the cargo pod 100. In some embodiments, the cargo pod 100 can be strapped, latched, bolted, or otherwise secured onto the flatbed 981. In some embodiments, the cargo pod 100 can be releasably secured to the flatbed 981 to permit multiple ones of the cargo pods 100 to be easily released/attached to the vehicle 902. That is, the vehicle 902 can interchangeably carry different ones of the cargo pods 100. In one aspect of the present technology, because the vehicle 902 does not include any doors, the cargo pod 100 can be placed directly onto the flatbed 981 during loading and does not need to be configured to slide relative to the vehicle 902 to enable loading of or access to the cargo pod 100. Accordingly, the vehicle 902 can essentially comprise an autonomous powertrain and chassis configured to receive the easily removable/attachable (e.g., swappable) cargo pod 100 thereon. The vehicle 902 can carry/include the autonomous driving sensors and computing equipment necessary for providing the autonomous functionality of the vehicle 902. In some embodiments, the length, drive system, and/or other characteristics of the vehicle 902 can be selected based on a desired delivery range for the vehicle 902 (e.g., long haul, medium haul, or short haul), capacity, etc. In some embodiments, the vehicle 902 can be made more cheaply than conventional vehicles configured to be driven by a human operator.

In some embodiments, some or all of the electronics/circuitry of the vehicle 902 (e.g., FIG. 8) can be integrated with some or all of the electronics/circuitry of the cargo pod 100 (e.g., FIG. 6). That is, for example, the vehicle 902 or the cargo pod 100 can include a centralized electrical and data connector box that controls operation of both the vehicle 902 and the cargo pod 100, and the cargo pod 100 and the vehicle 902 can be communicatively coupled together via a wired and/or wireless connection. More particularly, in some embodiments the cargo pod 100 can include all the communication circuitry, vehicle computing circuitry, location circuitry, vehicle software, etc., for operating the vehicle 902 while the vehicle 902 consists essentially of the physical components required to physically displace the vehicle 902 (e.g., maneuvering system, actuators, etc.). Accordingly, the vehicle 902 can essentially be a "dumb" system while the cargo pod 100 includes all the "intelligence" for operating the vehicle 902 to make deliveries. In other embodiments, the vehicle 902 can include all or most of the processing equipment and circuitry for the autonomous driving system and a centralized connection to the cargo pod 100, while the cargo pod 100 consists essentially of the physical components and their controls (e.g., the cargo control system 580 shown in FIG. 6 and the door drive mechanisms 440, 460 shown in FIG. 4A) for providing selective access to delivery items carried by the cargo pod 100. Accordingly, the cargo pod 100 can be a loading and unloading system that is attachable to and detachable from the autonomous vehicle 902.

In yet other embodiments, the cargo pod 100 can have wheels attached thereto, and a corresponding delivery vehicle can include a coupling configured to engage the cargo pod 100 to pull the cargo pod 100 along the delivery route. That is, the delivery vehicle can function like a conventional over-the-road tractor vehicle configured to be coupled to the cargo pod 100 and to pull the cargo pod 100 over the road. In such embodiments, the cargo pod 100 need not be loaded onto/into a delivery vehicle—potentially reducing loading and/or delivery times. In some embodiments, a conventional tractor can be used to pull the delivery chassis/powertrain (e.g., the delivery vehicle 902) and/or the cargo pod 100 only in the event of a system failure.

VI. Conclusion

The above Detailed Description of examples of the present technology is not intended to be exhaustive or to limit the present technology to the precise form disclosed above. While specific examples for the present technology are described above for illustrative purposes, various equivalent modifications are possible within the scope of the present technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples; alternative implementations may employ differing values or ranges.

These and other changes can be made to the present technology in light of the above Detailed Description. While the Detailed Description describes certain examples of the present technology as well as the best mode contemplated, the present technology can be practiced in many ways, no matter how detailed the above description appears in text. Details of the system may vary considerably in its specific implementation, while still being encompassed by the technology disclosed herein. As noted above, particular terminology used when describing certain features or aspects of the present technology should not be taken to imply that the terminology is being redefined herein to be restricted to any specific characteristics, features, or aspects of the present technology with which that terminology is associated. Accordingly, the present technology is not limited, except as by the appended claims. In general, the terms used in the following claims should not be construed to limit the present technology to the specific examples disclosed in the specification, unless the above Detailed Description section explicitly defines such terms.

Although certain aspects of the present technology are presented below in certain claim forms, the applicant contemplates the various aspects of the present technology in any number of claim forms. Accordingly, the applicant reserves the right to pursue additional claims after filing this application to pursue such additional claim forms, in either this application or in a continuing application.

We claim:

1. A mobile delivery system, comprising:
    a vehicle; and
    a cargo pod configured to be interchangeably secured to the vehicle, the cargo pod including—
        a plurality of cargo compartments; and
        an access system configured to at least partially enclose the cargo compartments and to define an aperture, wherein the access system is further configured to autonomously vary at least one of a size and a position of the aperture to provide access to a selected one of the cargo compartments while blocking access to the other ones of the cargo compartments.

2. The mobile delivery system of claim 1 wherein the vehicle is an autonomous vehicle.

3. The mobile delivery system of claim 2 wherein the autonomous vehicle includes control circuitry, and wherein the control circuitry is configured to control operation of the autonomous vehicle and the access system.

4. The mobile delivery system of claim 2 wherein the cargo pod includes control circuitry, and wherein the control circuitry is configured to control operation of the autonomous vehicle and the access system.

5. The mobile delivery system of claim 2 wherein the vehicle is an autonomous ground vehicle.

6. The mobile delivery system of claim 1 wherein the vehicle includes a power train and a chassis, wherein the chassis is configured to carry the cargo pod thereon.

7. The mobile delivery system of claim 1 wherein the vehicle includes an interior space, wherein the vehicle is configured to carry the cargo pod in the interior space, and wherein the cargo pod is configured to be secured in and removed from the interior space.

8. The mobile delivery system of claim 7 wherein the cargo pod is slidably positioned within the interior space.

9. The mobile delivery system of claim 1 wherein the cargo compartments are first cargo compartments, wherein the access system is a first access system, wherein the aperture is a first aperture, and wherein the cargo pod further includes—
    a plurality of second cargo compartments; and
    a second access system configured to at least partially enclose the second cargo compartments and to define a second aperture, wherein the second access system is further configured to vary at least one of a size and a position of the second aperture to provide access to a selected one of the second cargo compartments while blocking access to the other ones of the second cargo compartments.

10. The mobile delivery system of claim 9 wherein the vehicle includes a first side door and a second side door, wherein the selected one of the first cargo compartments is accessible via the first side door, and wherein the selected one of the second cargo compartments is accessible via the second side door.

11. The mobile delivery system of claim 10 wherein the vehicle further includes a rear door, and wherein the cargo pod is removable from the vehicle via the rear door.

12. The mobile delivery system of claim 1 wherein the access system is configured to vary at least one of the size and the position of the aperture without human intervention.

13. The mobile delivery system of claim 1 wherein the cargo pod further includes a framework that defines a cargo space having a generally planar opening, and wherein the access system includes a plurality of doors coupled to the framework and configured to slide across the opening to vary at least one of the size and the position of the aperture.

14. A mobile delivery system, comprising:
    a plurality of cargo pods, wherein the cargo pods each include an access system configured to at least partially enclose a cargo space having a plurality of compartments, wherein the access system of each cargo pod is configured to autonomously vary a size of an aperture of a selected one of the compartments to provide access to the selected one of the compartments while blocking access to the other ones of the compartments; and
    a vehicle configured to interchangeably carry individual ones of the cargo pods along one or more delivery routes.

15. The mobile delivery system of claim 14 wherein the vehicle is an autonomous ground vehicle.

16. The mobile delivery system of claim 14 wherein the vehicle is a first vehicle, and further comprising a second vehicle configured to interchangeably carry individual ones of the cargo pods.

17. The mobile delivery system of claim 14 wherein the vehicle includes a flatbed configured to carry the individual ones of the cargo pods thereon.

18. The mobile delivery system of claim 14 wherein the cargo pods are substantially identical.

19. A method of mobile delivery, the method comprising:
    securing a first cargo pod to a vehicle, wherein the first cargo pod includes (a) a plurality of cargo compartments and (b) an access system configured to at least partially enclose the cargo compartments and to define an aperture;
    moving, via the vehicle, the first cargo pod along a first delivery route to at least one first delivery location;
    at the first delivery location, autonomously varying at least one of a size and a position of the aperture to provide access to a selected one of the cargo compartments while blocking access to the other ones of the cargo compartments;
    releasing the first cargo pod from the vehicle;

securing a second cargo pod to the vehicle; and moving, via the vehicle, the second cargo pod along a second delivery route to at least one second delivery location.

20. The method of claim 19 wherein the cargo compartments are first cargo compartments, wherein the access system is a first access system, wherein the aperture is a first aperture, wherein the second cargo pod includes (a) a plurality of second cargo compartments and (b) a second access system configured to at least partially enclose the second cargo compartments and to define a second aperture, and wherein the method further comprises:

at the second delivery location, autonomously varying at least one of a size and a position of the second aperture to provide access to a selected one of the second cargo compartments while blocking access to the other ones of the second cargo compartments.

21. The method of claim 19 wherein the vehicle comprises a rolling chassis and an electric powertrain, wherein the rolling chassis is configured to interchangeably receive and secure the first cargo pod and the second cargo pod, and wherein the electric powertrain is configured to move the rolling chassis along the first delivery route and the second delivery route.

22. The method of claim 19 wherein the method further comprises loading the second cargo pod with cargo while moving the first cargo pod along the first delivery route.

23. The method of claim 22 wherein the method further comprises, after releasing the first cargo pod from the vehicle, loading at least one of the cargo compartments of the first cargo pod with cargo while moving the second cargo pod along the second delivery route.

* * * * *